United States Patent
Cabral et al.

(10) Patent No.: US 10,165,258 B2
(45) Date of Patent: Dec. 25, 2018

(54) EFFICIENT DETERMINATION OF OPTICAL FLOW BETWEEN IMAGES

(71) Applicant: Facebook, Inc., Menlo Park, CA (US)

(72) Inventors: Brian Keith Cabral, San Jose, CA (US); Forrest Samuel Briggs, Palo Alto, CA (US); Albert Parra Pozo, San Mateo, CA (US); Peter Vajda, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 108 days.

(21) Appl. No.: 15/096,167

(22) Filed: Apr. 11, 2016

(65) Prior Publication Data

US 2017/0295354 A1    Oct. 12, 2017

Related U.S. Application Data

(60) Provisional application No. 62/319,074, filed on Apr. 6, 2016.

(51) Int. Cl.
*H04N 13/243*    (2018.01)
*H04N 13/282*    (2018.01)
(Continued)

(52) U.S. Cl.
CPC ......... *H04N 13/282* (2018.05); *G06T 3/4038* (2013.01); *G06T 7/003* (2013.01);
(Continued)

(58) Field of Classification Search
CPC .................................................. H04N 13/0022
See application file for complete search history.

(56) References Cited

U.S. PATENT DOCUMENTS 5,703,961 A * 12/1997 Rogina ................ G06K 9/209
                                                           382/154
5,760,826 A     6/1998 Nayar
(Continued)

FOREIGN PATENT DOCUMENTS

EP        2 242 252 A2    10/2010
EP        2 677 500 A2    12/2013
WO    WO 2015/027105 A1    2/2015

OTHER PUBLICATIONS

Chen, S. E. et al., View Interpolation for Image Synthesis, *20th Annual Conference on Computer Graphics and Interactive Techniques*, Sep. 1, 1993, pp. 279-288, Anaheim, California, USA, ACM Siggraph Publication.
(Continued)

*Primary Examiner* — Jayanti K Patel
*Assistant Examiner* — Irfan Habib
(74) *Attorney, Agent, or Firm* — Fenwick & West LLP

(57) ABSTRACT

A canvas generation system generates a canvas view of a scene based on a set of original camera views depicting the scene, for example to recreate a scene in virtual reality. Canvas views can be generated based on a set of synthetic views generated from a set of original camera views. Synthetic views can be generated, for example, by shifting and blending relevant original camera views based on an optical flow across multiple original camera views. An optical flow can be generated using an iterative method which individually optimizes the optical flow vector for each pixel of a camera view and propagates changes in the optical flow to neighboring optical flow vectors.

20 Claims, 15 Drawing Sheets

(51) Int. Cl.

| | | |
|---|---|---|
| H04N 13/257 | (2018.01) | |
| H04N 13/128 | (2018.01) | |
| H04N 13/156 | (2018.01) | |
| G06T 7/20 | (2017.01) | |
| G06T 19/00 | (2011.01) | |
| H04N 13/111 | (2018.01) | |
| G06T 3/40 | (2006.01) | |
| G06T 7/00 | (2017.01) | |
| H04N 5/247 | (2006.01) | |
| H04N 13/239 | (2018.01) | |
| G06T 7/207 | (2017.01) | |

(52) U.S. Cl.
CPC ............ *G06T 7/2006* (2013.01); *G06T 7/207* (2017.01); *G06T 7/2066* (2013.01); *G06T 19/006* (2013.01); *H04N 5/247* (2013.01); *H04N 13/111* (2018.05); *H04N 13/128* (2018.05); *H04N 13/156* (2018.05); *H04N 13/239* (2018.05); *H04N 13/243* (2018.05); *H04N 13/257* (2018.05); *G06T 2200/32* (2013.01); *G06T 2207/10012* (2013.01); *G06T 2207/10024* (2013.01)

(56) References Cited

U.S. PATENT DOCUMENTS

| | | | |
|---|---|---|---|
| 6,269,175 B1 * | 7/2001 | Hanna | G06T 5/50 382/107 |
| 6,532,036 B1 | 3/2003 | Shmuel et al. | |
| 6,559,846 B1 * | 5/2003 | Uyttendaele | G06T 15/005 345/473 |
| 9,088,714 B2 * | 7/2015 | Doepke | H04N 5/23238 |
| 9,098,922 B2 * | 8/2015 | Tico | H04N 5/23238 |
| 9,338,463 B2 * | 5/2016 | Tanchenko | H04N 19/176 |
| 9,378,544 B2 * | 6/2016 | Cha | H04N 5/23238 |
| 9,704,298 B2 * | 7/2017 | Espeset | G06T 15/04 |
| 9,934,615 B2 * | 4/2018 | Cabral | G06T 5/50 |
| 9,992,457 B2 * | 6/2018 | Lin | H04N 5/2258 |
| 2001/0030693 A1 | 10/2001 | Fisher et al. | |
| 2002/0061131 A1 | 5/2002 | Sawhney | |
| 2002/0113791 A1 | 8/2002 | Li et al. | |
| 2002/0126890 A1 | 9/2002 | Katayama et al. | |
| 2003/0117488 A1 * | 6/2003 | Pierce | H04N 5/23238 348/48 |
| 2003/0122949 A1 | 7/2003 | Kanematsu et al. | |
| 2006/0125921 A1 * | 6/2006 | Foote | G06T 3/4038 348/159 |
| 2007/0030342 A1 | 2/2007 | Wilburn et al. | |
| 2008/0226123 A1 * | 9/2008 | Birtwistle | G06T 11/001 382/100 |
| 2009/0103779 A1 * | 4/2009 | Loehlein | G06K 9/00369 382/103 |
| 2009/0153549 A1 * | 6/2009 | Lynch | G06T 15/205 345/419 |
| 2009/0296989 A1 * | 12/2009 | Ramesh | G06K 9/00771 382/103 |
| 2010/0183192 A1 * | 7/2010 | Fritsch | G06T 7/254 382/103 |
| 2011/0002544 A1 * | 1/2011 | Oshima | G06K 9/6211 382/190 |
| 2011/0043604 A1 * | 2/2011 | Peleg | G06T 3/4038 348/36 |
| 2012/0075535 A1 | 3/2012 | Van Beek | |
| 2013/0278719 A1 | 10/2013 | Rusert et al. | |
| 2014/0098100 A1 | 4/2014 | Dane et al. | |
| 2014/0132706 A1 * | 5/2014 | Kira | H04N 13/111 348/36 |
| 2014/0146132 A1 * | 5/2014 | Bagnato | G02B 27/2228 348/36 |
| 2015/0163473 A1 | 6/2015 | Osawa et al. | |
| 2015/0358613 A1 | 12/2015 | Sandrew et al. | |
| 2015/0365645 A1 | 12/2015 | Bruls et al. | |
| 2015/0365646 A1 | 12/2015 | Bruls et al. | |
| 2015/0371397 A1 * | 12/2015 | Wang | G01B 11/14 382/159 |
| 2016/0065947 A1 * | 3/2016 | Cole | H04N 13/239 348/43 |
| 2016/0253810 A1 * | 9/2016 | Cole | H04N 13/344 345/672 |
| 2016/0255322 A1 * | 9/2016 | Kerofsky | G06F 3/04815 348/51 |
| 2016/0314622 A1 * | 10/2016 | Davis | G06T 19/006 |
| 2016/0353089 A1 * | 12/2016 | Gallup | G02B 27/0172 |
| 2016/0353090 A1 * | 12/2016 | Esteban | G02B 27/0172 |
| 2016/0353146 A1 | 12/2016 | Weaver et al. | |
| 2017/0061623 A1 * | 3/2017 | Jaehnisch | G06T 7/20 |
| 2017/0076429 A1 * | 3/2017 | Russell | G06T 3/4038 |
| 2017/0134714 A1 * | 5/2017 | Soni | H04N 5/23238 |
| 2017/0142312 A1 * | 5/2017 | Dal Mutto | H04N 5/332 |
| 2017/0236290 A1 * | 8/2017 | Sorkine Hornung | G06T 7/11 382/173 |
| 2017/0294045 A1 * | 10/2017 | Cabral | G06T 5/50 |
| 2017/0372360 A1 * | 12/2017 | Duggal | G06Q 30/0255 |
| 2018/0054607 A1 * | 2/2018 | Cole | H04N 13/232 |
| 2018/0186472 A1 * | 7/2018 | Wan | B64D 47/08 |
| 2018/0205941 A1 * | 7/2018 | Kopf | H04N 13/221 |
| 2018/0234674 A1 * | 8/2018 | Smith | H04N 13/282 |

OTHER PUBLICATIONS

European Patent Office, Search Report and Opinion, European Patent Application No. 17164951.0, Aug. 29, 2017, eleven pages.

European Patent Office, Search Report and Opinion, European Patent Application No. 17164561.7, Aug. 29, 2017, nine pages.

Lempitsky, V. et al., "FusionFlow: Discrete-Continuous Optimization for Optical Flow Estimation," *IEEE Conference on Computer Vision and Pattern Recognition (CVPR 2008)*, Jun. 23, 2008, Piscataway, New Jersey, USA, eight pages.

PCT International Search Report and Written Opinion, PCT Application No. PCT/US2017/024303, Jul. 11, 2017, thirteen pages.

PCT International Search Report and Written Opinion, PCT Application No. PCT/US2017/024306, Jul. 11, 2017, thirteen pages.

PCT International Search Report and Written Opinion, PCT Application No. PCT/US2017/026321, Jul. 19, 2017, sixteen pages.

Sim, D-G. et al., "A Two-Stage Algorithm for Motion Discontinuity-Preserving Optical Flow Estimation," *Computer Vision and Image Understanding*, Jan. 1997, pp. 19-37, vol. 65, No. 1.

Barnes et al., "PatchMatch: A Randomized Correspondence Algorithm for Structural Image Editing," CS 294-60 Paper Presentation, Princeton University, Sep. 16, 2011, twenty-one pages.

Barnes et al., "PatchMatch: A Randomized Correspondence Algorithm for Structural Image Editing," ACM Transactions on Graphics (TOG)—Proceedings of ACM SIGGRAPH 2009, vol. 28 Issue 3 Article No. 24, Aug. 2009, ten pages.

Bleyer et al., "PatchMatch Stereo—Stereo Matching with Slanted Support Windows," Proceedings of the British Machine Vision Conference, pp. 14.1-14.11. BMVA Press, Sep. 2011. http://dx.doi.org/10.5244/C.25.14.

Bourke, Paul, "Synthetic stereoscopic panoramic images," Proceedings of the 12th International Conference on Interactive Technologies and Sociotechnical Systems, 2006, pp. 147-155.

Bourke, Paul, "Synthetic Stereoscopic Panoramic Images," University of Western Australia, 2006, fourteen pages.

Brox et al., "High Accuracy Optical Flow Estimation Based on a Theory for Warping," Proc. 8th European Conference on Computer Vision, May 2004, vol. 4, pp. 25-36, Prague, Czech Republic.

Heise et al., "PM-Huber: PatchMatch with Huber Regularization for Stereo Matching," ICCV 2013—IEEE International Conference on Computer Vision, Mar. 3, 2014, pp. 2360-2367.

Horn, Berthold K. and Schunck, Brian G, "Determining Optical Flow," *Artificial Intelligence*, vol. 17, 1981, pp. 185-203.

Seymour, Mike, "Art of Optical Flow," fxguide, Feb. 28, 2006, thirty-seven pages, [Online] [Retrieved on Oct. 5, 2016], Retrieved from the Internet<URL:https://www.fxguide.com/featured/art_of_optical_flow/.

(56) References Cited

OTHER PUBLICATIONS

Sun et al., "Secrets of Optical Flow Estimation and Their Principles," 2010 IEEE Conference on Computer Vision and Pattern Recognition (CVPR), Aug. 5, 2010, pp. 2432-2439.

Weinzaepfel et al., "DeepFlow: Large displacement optical flow with deep matching," ICCV 2013—IEEE International Conference on Computer Vision, Oct. 16, 2013, eight pages.

\* cited by examiner

EFFICIENT DETERMINATION OF OPTICAL FLOW BETWEEN IMAGES

CROSS REFERENCE TO RELATED APPLICATIONS

This application claims the benefit of U.S. Provisional Application No. 62/319,074, titled "Canvas View Generation Using Optical Flow" filed Apr. 6, 2016, which is incorporated by reference in its entirety.

BACKGROUND

This disclosure relates generally to the generation of canvas views for a virtual reality headset, and more particularly to canvas view generation from images captured by cameras. A canvas view represents a panoramic wide-angle view to recreate a scene in virtual reality, and can be paired with other canvas views to give a 3D stereoscopic effect of the scene. Existing techniques for canvas view generation can operate slowly, for example requiring manual stitching or other input from a user, and can encounter problems when dealing with discrepancies in the source camera views, such as different brightness or color between camera views.

SUMMARY

An embodiment of an invention can generate a canvas view of a scene based on a set of original camera views or images depicting the scene, for example captured by cameras of an image capture system and depicting a scene captured by a plurality of cameras. Canvas views can be generated based on a first mapping associating each region of the canvas view with a region of a synthetic view based on the location of the synthetic and a second mapping associating regions of camera views with regions of the synthetic view. The generated mappings can be combined to generate a combined mapping associating each region of the canvas view with regions of one or more camera views of the set of camera views which can then be applied to the camera views to generate the canvas view.

A synthetic view can be generated, for example, based on a first and second camera view representing images of the scene sharing one or more common objects. An optical flow associating pixels between the first and second camera views can be used to relate the first and second camera views. Based on the optical flow, the first and second camera views can be "shifted" to each approximate the desired synthetic view. Both approximations of the synthetic view can then be blended or averaged together (i.e., the pixel color values) to generate the synthetic view.

During the generation of a synthetic view, an optical flow can be used associating corresponding points across multiple camera views. For example, an optical flow can associate pixels between camera views represented as a set of optical flow vectors each associating two or more corresponding pixels. Optical flows can be generated based on, for example, an iterative method which individually optimizes the optical flow vector for each pixel of a camera view. For example by generating a set of optical flow proposals for each pixel, analyzing each optical flow proposal and updating the optical flow for each pixel based on an optical flow proposal of the set of optical flow proposals that improves the optimization of the optical flow. In some implementations, changes to the optical flow vector can be propagated to neighboring optical flow vectors.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
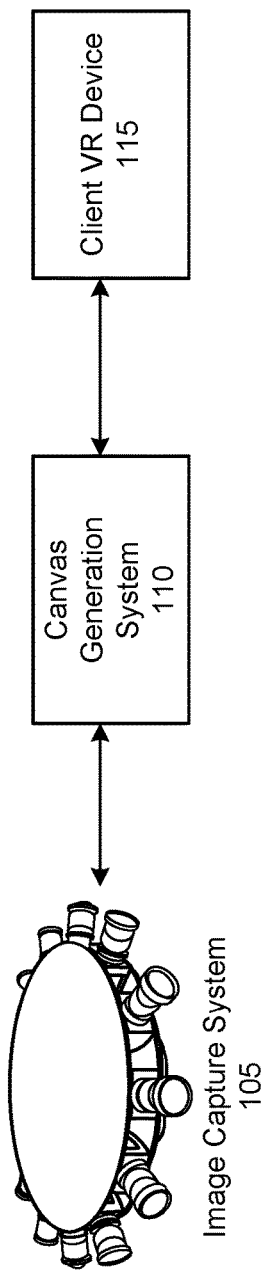
FIG. 1 is a block diagram of a system environment in which a canvas generation system operates, in accordance with an embodiment of the invention.

FIG. 1 is a block diagram of a system environment in which a canvas generation system operates, in accordance with an embodiment of the invention. The system environment 100 shown by FIG. 1 comprises an image capture system 105, a canvas generation system 110, and a client virtual reality (VR) device 115. In other embodiments, the system environment 100 can include different or additional components.

The image capture system 105 captures multiple camera views of a scene that is processed by the canvas generation system 110 and can be presented to a user via the client VR device 115. A scene can represent a physical environment in which an image capture system 105 captures camera views. The scene may later be augmented by the canvas generation system 105 to add virtual components to the scene. For example, a scene can be a park in which a physical image capture system 105 is placed in order to capture camera views of the park. A camera view is a view of the scene captured from an image sensor of a camera located on the image capture system 105.

In some embodiments, the image capture system 105 includes a collection of cameras, each camera oriented to capture a different camera view of the scene. In other embodiments, the image capture system 105 is a camera configured to capture a camera view of the scene. Cameras of the image capture system 105 can be still or video cameras, for example, action cameras, camcorders, mobile phone cameras, high speed cameras, or any other suitable image capture devices. Cameras of the image capture system 105 can be globally synchronized to capture images at the same time and can also use a global shutter to improve performance for capturing fast moving objects. In some embodiments, the image capture system 105 is constructed out of commercially available components and cameras, but any suitable proprietary or commercially available camera can be used in an image capture system 105.

In some configurations, camera views are captured from the perspective of or in relation to a certain origin point if the image capture system 105. For example, the image capture system 105 can comprise a ring of outward facing cameras centered on an origin point, capturing camera views covering a full 360 degree panorama of angles around the origin point of the image capture system 105. Alternate embodiments of an image capture system 105 can capture camera views representing a full 360 degree sphere around an origin point, representing a partial panorama or sphere of views, or any other suitable subset of views around an origin point. Similarly, camera views captured by the image capture system 105 can be captured simultaneously, sequentially, or in any other suitable order. For example, the image capture system 105 can capture camera views simultaneously by using multiple cameras, such as in the case of an image capture system 105 capturing multiple high resolution still images of a scene, alternatively, the image capture system 105 can capture images sequentially from one or more cameras, such as in the case of a camera capturing video.

In some implementations, the image capture system 105 comprises a plurality of cameras simultaneously capturing video of the scene from a known position within the scene. In other embodiments, the image capture system 105 does not have a fixed position within the scene, such as in an embodiment when the image capture system 105 is mounted to a person, vehicle, or other mobile object. The positions of the captured camera views can be known in relation to each other or in relation to an origin point of the image capture system 105 or the scene. The image capture system 150 can communicate with the canvas generation system 110, for instance to transmit captured camera views to the canvas generation system 110. The canvas generation system 110 receives camera views input from the image capture system 105 directly, over a network such as a local area network or the internet, or by any other suitable method.

The canvas generation system 110, according to some embodiments, processes received camera views to generate a canvas view representing a scene. A canvas view can be any image depicting a scene so that the scene can be recreated in virtual reality, for example a panoramic, spherical panoramic, or suitably wide angle image. For example, a canvas view can be output in cubemap, equirectangular, or cylindrical formats in resolutions such as "8K" (for example 8192 by 8192 pixels). The canvas view thus can represent a range of angles of the scene that may be viewed by the client VR device 115. When the user turns or rotates the client VR device 115, a different angle of the canvas view may be presented to the user. The canvas generation system 110 may generate two canvas views—one for each of the user's eyes, to provide stereoscopic images to the client VR device 115.

In some embodiments, canvas views are generated by combining a set of original camera views of a scene to generate a canvas view capturing more information about the scene than any one of the camera views. Original camera views can be camera views received from the image capture system 105. Canvas views can be displayed on a client VR device 115 to create a virtual reality representation of a scene. In some embodiments, canvas views are generated based on a single static position in a scene (hereinafter a viewpoint), for example. Alternatively, a canvas view can be generated based on a collection or set of viewpoints, for example approximating the locations of a user's eye as they move their head to look around the scene in virtual reality. As discussed more fully below, the viewpoint for a canvas view may move according to angle of the canvas view to represent the turning viewpoint of each eye.

A canvas view of a scene is may represent partial light information approximation used to replicate light information intersecting at a specific point (hereinafter a viewpoint). In general, a complete representation of light information for a scene describes rays of light traveling through a space for which the light information is calculated, however, light information associated with a specific viewpoint can be approximated by gathering color information on rays that intersect that point. For example, light ray color information can be gathered by a camera, which captures color information about light rays that intersect with the camera's image sensor. Each pixel in a camera view can represent information about one or more light rays striking an image sensor of a camera, capturing color information about that light ray. The collected color information is then represented as pixel intensity information of the pixels in the camera view generated by the camera. In some implementations, information from multiple camera views can be combined to form a canvas view which can be used to approximate the light information at a single viewpoint. Similarly, a canvas view can be used to recreate relevant light information at viewpoints representing the possible locations of a user's eye as the user turns their head in a virtual reality scene. Generated canvas views can be transmitted for display to a user by a client VR device 115 or stored for later use by the client VR device 115 or for other suitable purposes.

The client VR device 115 receives canvas views from the canvas generation system 110 and displays the canvas views to a user of the client VR device 115. In some implementations, a client VR device 115 operates by recreating light information of a scene at viewpoints corresponding to each eye of a user positioned in the scene. Each partial light information approximation can then be separately shown to the corresponding eye of the user, creating a 3D virtual reality effect. In some implementations, the partial light information approximation can be generated by displaying a generated canvas view to a user of the client VR device 115. The partial light information approximation can create an approximation of the user's view at a zero parallax distance.

In some embodiments, a client VR device 115 is a head-mounted VR system. The client VR device 115 can be capable of showing a different canvas view to each eye of a user, for example to provide a stereoscopic 3D effect to a user of the client VR device. In some configurations, a client VR device 115 presents an interactive experience to the user, such as by displaying canvas views responsive to the user's actions. Additionally, a client VR device 115 can request specific canvas views or portions of canvas views from the canvas generation system 110, such as in response to a user action, based on a specific time, or for any other suitable reason.

Figure 2:
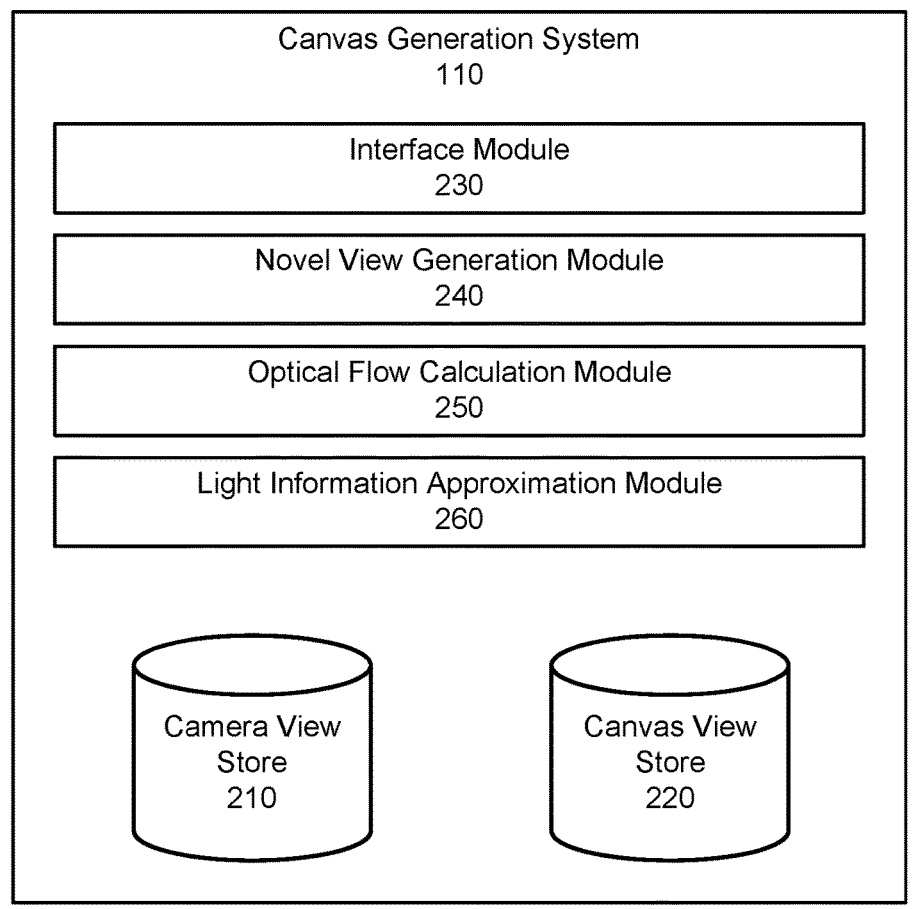
FIG. 2 is a block diagram of a canvas generation system, in accordance with an embodiment of the invention.

FIG. 2 is a block diagram of a canvas generation system, in accordance with an embodiment of the invention. In the embodiment of FIG. 2, the canvas generation system 110 includes a camera view store 210, a canvas view store 220, an interface module 230, a novel view generation module 240, an optical flow calculation module 250, and a light information approximation module 260. The canvas generation system 110 generates a canvas view based on a set of original camera views received from the image capture system 105.

The camera view store 210 can contain camera views, for example, a set of original camera views received from the image capture system 105. Camera views can be stored in any suitable format containing compressed or uncompressed image data, such as JPEG, PNG, RAW, or TIFF. Similarly, camera views can be stored in a suitable video format containing compressed or uncompressed image data for a sequence of camera views, for example, MPEG, AVI, or any other suitable format. In some embodiments, camera views comprise raw data from a color filter array (for example a Bayer filter) of a camera of the image capture system 105. Stored camera views can contain positional and pixel intensity information for each pixel of the stored camera view. Pixel intensity information for a pixel can contain brightness and color information controlling how that pixel is displayed, for example, pixel intensity can be captured in greyscale brightness information or RGB channel color information for a pixel. In some embodiments, camera views contained in the camera view store 210 can be associated with additional information, such as a viewpoint from which the camera view was captured from, such as the camera that captured the image and the camera's location and orientation in the image capture system 105. Camera views stored within the camera view store 210 can also be associated into groups, for example, a sequential group of images captured from the same physical camera or a group of images captured simultaneously from many cameras of the image capture system 105. Similarly, camera views processed by the canvas generation system 110 can be stored in the camera view store 210. For example, camera views can be processed from raw color filter array data to raster RGB pixel-based images, corrected for vignetting, or processed to alter add or remove sharpness/deconvolution, color balance or tone curve, brightness or gamma, pixel mosaicing, and lens distortion effects. In some embodiments, camera views can be processed by the canvas generation system 110 based on other camera views in a group, for example, mutual color correction between camera views in a group. In some embodiments, camera views can be converted raw Bayer filter data into RGB images image, and then processed using mutual color correction, anti-vignetting, gamma, sharpening and demosaicing techniques to generate a final corrected image.

The canvas view store 220, according to some embodiments, contains canvas views generated by the canvas generation system 110. Canvas views can be stored in any suitable image or video format. In some embodiments, canvas views are associated or grouped with other canvas views stored within the canvas view store 220, for example a left eye and right eye canvas view of the same scene can be associated in the canvas view store 220. Similarly, a sequence of canvas views, for example generated from several video camera views, can be grouped in the canvas view store 220.

The interface module 230 communicates with the image capture system 105 and client VR device 115. For example, the interface module 230 can receive original camera views from the image capture system 105 and transmit generated canvas views to the client VR device 115. In some embodiments, the canvas generation system 110 can also receive requests for specific canvas views from the client VR device 115 via the interface module 230.

The novel view generation module 240 generates a synthetic view based on existing camera views, according to some embodiments. A synthetic view simulates a camera view that would have been captured by a theoretical or hypothetical camera (hereinafter, a synthetic camera) positioned at a specific location in the scene (hereinafter, the synthetic camera location) would have captured. Synthetic views can be generated based on the synthetic camera location and camera views from cameras near to the synthetic camera location, and, in some implementations, can be stored in the camera view store 210 once generated. In some configurations, the novel view generation module 240 generates synthetic views based on an optical flow between camera views and the locations of the cameras capturing the camera views. The novel view generation module 240 will be discussed in greater detail below.

In some embodiments, the optical flow calculation module 250 detects corresponding pixels in two or more camera views and generates an optical flow based on the detected corresponding pixels. An optical flow can be a vector displacement field or other dataset associating pixels in a first camera view with corresponding pixels in a second camera view through a displacement vector for each pixel of the first camera view. According to some embodiments, an optical flow is an equation relating pixels in one camera view with pixels in a second camera view. In some implementations, optical flows can be calculated for many groupings of camera views depending on the number and orientations of cameras in the image capture system 105. For example, an optical flow can be calculated for each camera view to its neighboring cameras in a ring of cameras. For each pair of cameras, an optical flow may be calculated from the first camera to the second camera and from the second camera to the first. In some embodiments, optical flows between three or more camera views are needed, for example, in the case of an image capture system 105 configured to capture a spherical panorama an optical flow may be needed between two cameras in a horizontal plane and an elevated or upward facing top camera. The optical flow calculation module 250 will be discussed in greater detail below.

In some embodiments, the light information approximation module 260 generates canvas views by combining multiple camera views into a single image. For example, canvas views can be generated based on camera views captured by the image capture system 105, synthetic views generated by the novel view generation module 240, or any combination of suitable camera views. Canvas views generated by the light information approximation module 260 can be generated to be suitable for display on the client VR device 115, for example by approximating light information for display to a user of the client VR device 115. The light information approximation module 260 will be discussed in greater detail below.

Figure 3:
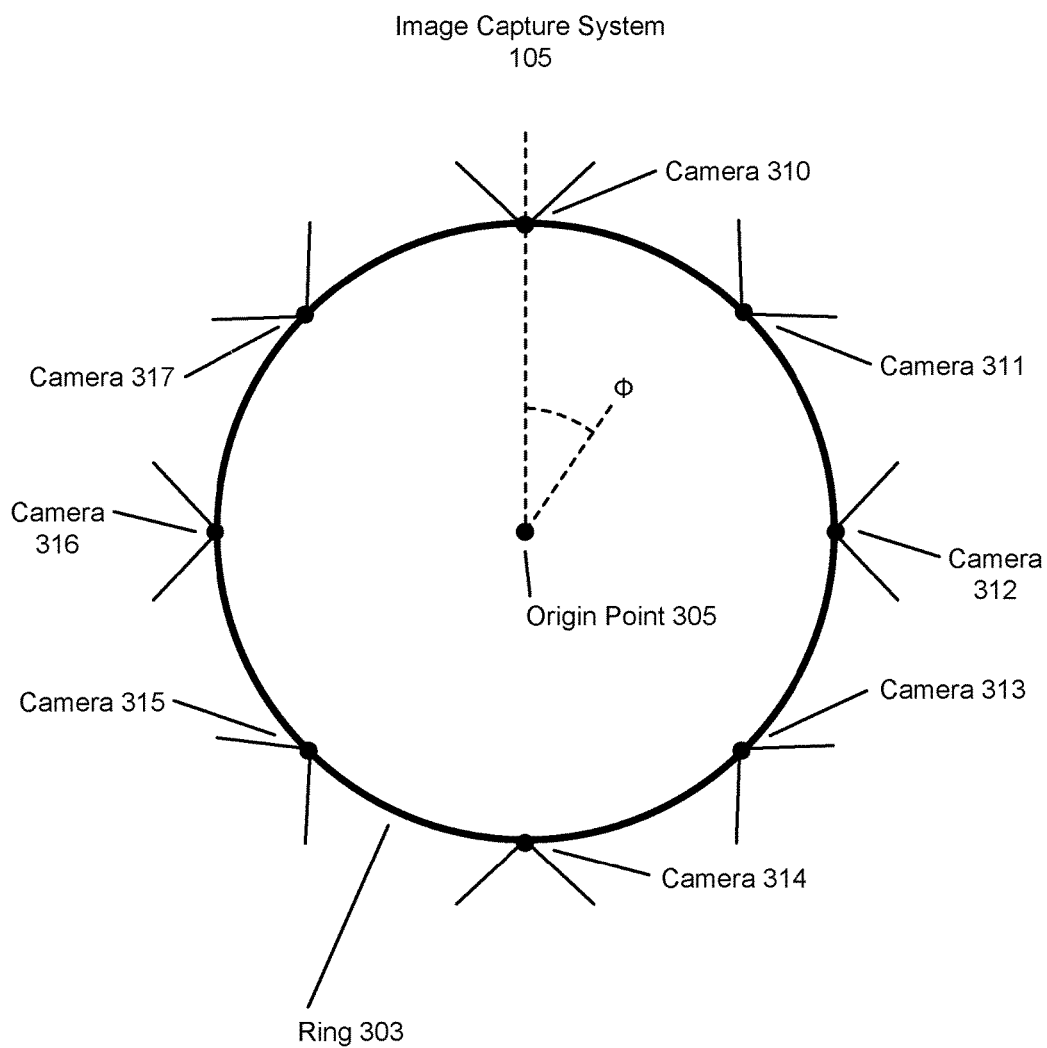
FIG. 3 is a line diagram showing the construction of an example image capture system, according to some embodiments.

FIG. 3 is a line diagram showing an example image capture system, according to some embodiments. The image capture system 105 of FIG. 3 includes an origin point 305, ring 303, and cameras 310-317. In this configuration, the image capture system 105 is centered on an origin point 305. The cameras 310-317 are positioned around a ring 303 centered on the origin point 305. In some embodiments, the cameras 310-317 are physically supported by the ring 303 or another similar support structure and can be positioned at known locations in a circle of a known diameter. Similarly, each camera 310-317 can have a known position and orientation relative to origin point 305, according to the embodiment of FIG. 3. Each camera 310-317 can have a defined field of view, for example based on the lens attached to the camera. In some embodiments, the centerline of each camera's field of view is aligned with the origin point 305, meaning that each camera 310-317 is oriented directly outwards from the ring 303. In other embodiments, cameras 310-317 can be oriented differently. A specific orientation or angle around the ring 303 can be described based on an angle $\Phi$ around the origin point 305. In this embodiment, camera 310 is positioned at $\Phi=0$, and the remaining cameras 311-317 are positioned at regular intervals around the ring 303.

Synthetic View Generation

The generation of synthetic views, for example by the novel view generation module 240, can be used in the generation of canvas views or for other situations in which a camera view is needed that is not available from the image capture system 105 in a set of original camera views. Synthetic views generated by the novel view generation module 240 can be generated based on a set of input camera views similar to the generated synthetic view. For example, camera views captured from similar locations and orientations to a desired synthetic camera location can be used to generate the synthetic view. In some embodiments, synthetic views have a similar field of view to the camera views used to generate the synthetic views. These synthetic views allow a view to be approximated as if another camera positioned at the synthetic camera location captured the synthetic view. In other embodiments, synthetic views are partial synthetic views representing smaller fields of view than in the input camera views, for example depicting only a region of the field of view of a camera view. In other implementations, the synthetic view generation module 240 outputs a mapping associating pixels in input camera views with specific pixels in a partial or full synthetic view. The generated mapping can capture the information of the synthetic view without actually calculating the exact values of all the pixels in the synthetic view.

Figure 4:
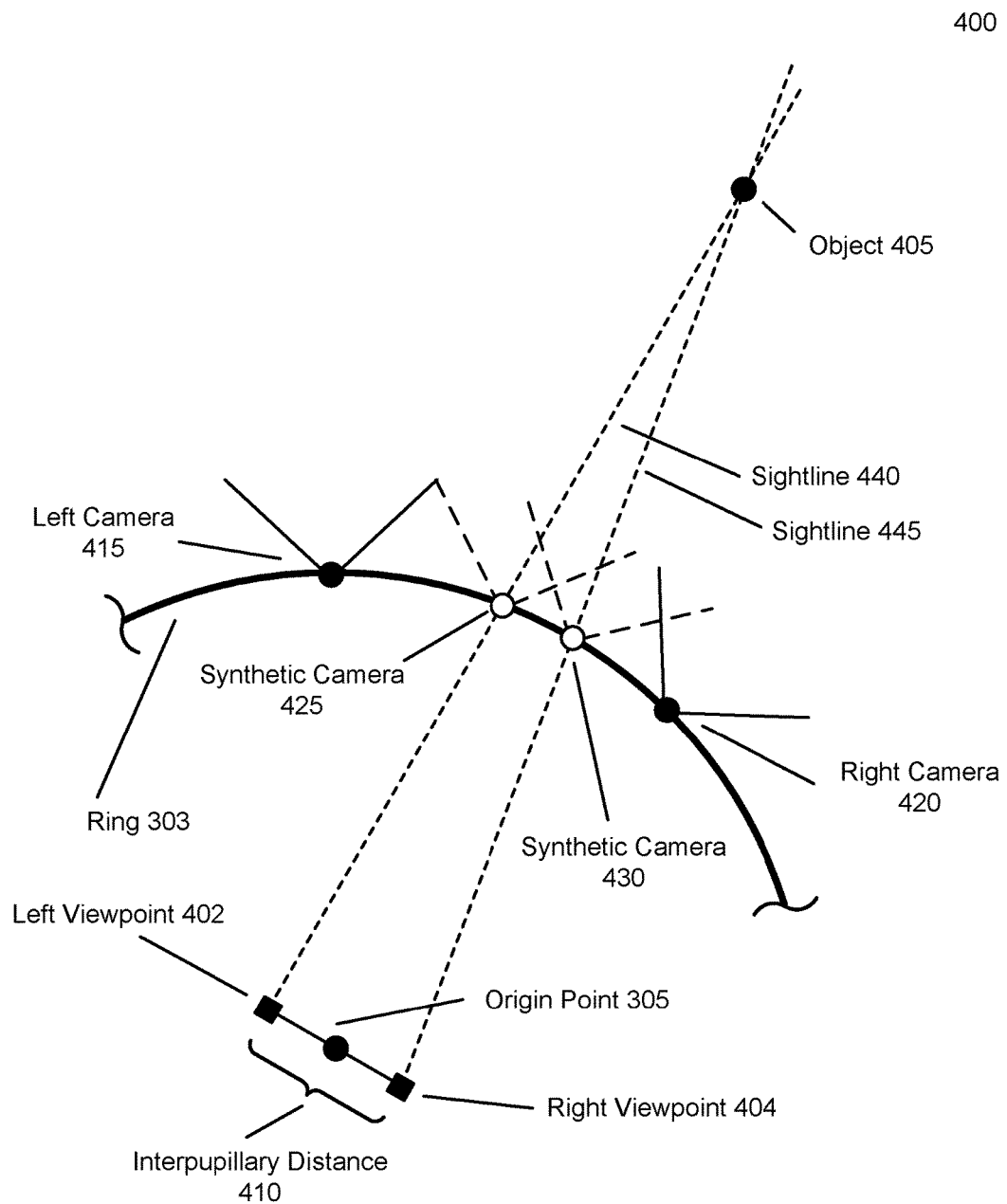
FIG. 4 is a line diagram illustrating the use of synthetic cameras in an example canvas generation system, according to some embodiments.

FIG. 4 is a line diagram illustrating the use of synthetic cameras in an example canvas generation system, according to some embodiments. Diagram 400 includes a ring 303, an origin point 305, left and right viewpoints 402 and 404, an object 405, an interpupillary distance 410, left and right cameras 415 and 420, synthetic cameras 425 and 430, and sightlines 440 and 445.

In some embodiments, for example when the canvas views will be used to display stereoscopic 3D, the canvas generation system 110 generates canvas views based on specific paired viewpoints within the scene. For example, to generate a pair of canvas views to create a stereoscopic 3D effect, the canvas view generation system can generate left and right canvas views from paired viewpoints separated by a distance similar to the distance between the eyes of a user (an interpupillary distance). An interpupillary distance can be any distance or displacement set by the canvas view generation system 110 between two viewpoints used to generate a stereoscopic 3D effect. For example, the interpupillary distance 410 represents an example distance between the left viewpoint 402 and the right viewpoint 404 approximating the distance between the eyes of a user of a client VR device 115. In some embodiments, the left and right viewpoints 402 and 404 are centered on the origin point 305, but the left and right viewpoints 402 and 404 can be located at any suitable location within the scene. Similarly, the left and right viewpoints 402 and 404 can represent two static viewpoints in some cases, but in other embodiments, the left and right viewpoints 402 and 404 can represent two viewpoints of a set of paired viewpoints, each separated by the interpupillary distance 410. The specific position of the left and right viewpoints for portions of a canvas view may be a function of the angle 1 around the origin point 305, to simulate the change in viewpoints for each eye as a user's head might turn around the origin point. Stated another way, the viewpoint for each eye may rotate about the origin point according to the angle an angle $\Phi$.

In FIG. 4, sightlines 440 and 445 represent the viewing angles of a hypothetical user's left and right eyes separated by the interpupillary distance 410, as a user's eyes (separated by the interpupillary distance 410) will verge or rotate to face the object 405 of focus. Cameras positioned at the points sightlines 440 and 445 intersect the ring 303 could approximate a user's view using a selected zero parallax distance, for example when the user is looking at the object 405. In the configuration of FIG. 4, left camera 415 and right camera 420 are not located at these intersection points, so camera views captured by these cameras cannot directly provide the needed information. However, views from synthetic cameras 425 and 430 positioned at the intersection points of sightlines 440 and 445 and the ring 303 can be calculated by the canvas generation system 110 to capture the information about the object 405 as viewed from the left and right viewpoints 402 and 404. In some embodiments, the zero parallax distance is determined on a per-object basis, for example depending on the distance of an object. In other implementations, the zero parallax distance is fixed, for example set at a constant distance or infinity. Views for each of the synthetic cameras 425 and 430 are each generated from the adjacent cameras, such as left camera 415 and right camera 420.

Figure 5A:
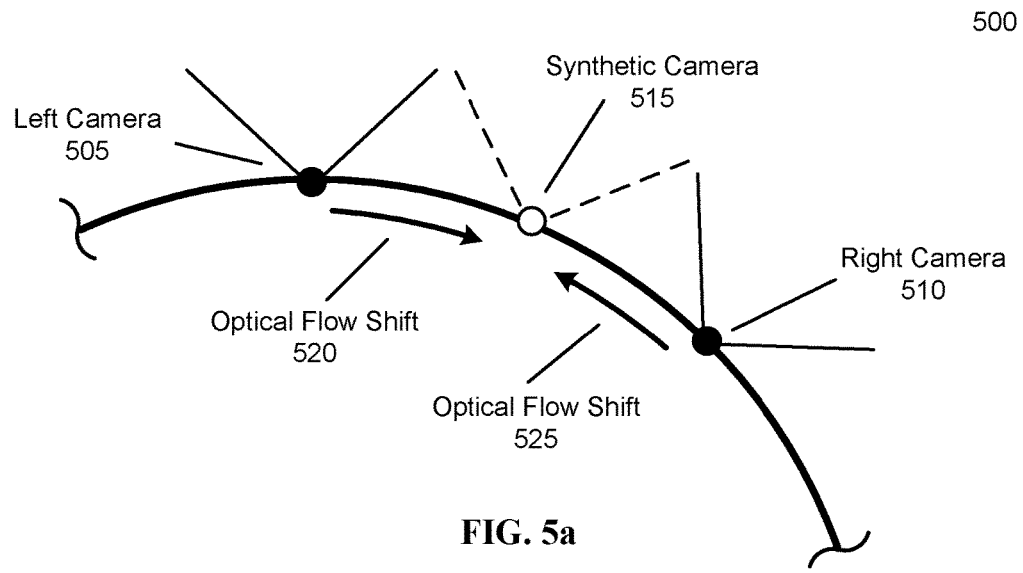
FIG. 5a is a line diagram illustrating the generation of an example synthetic view based on a left camera view and a right camera view, according to some embodiments.
Figure 5B:
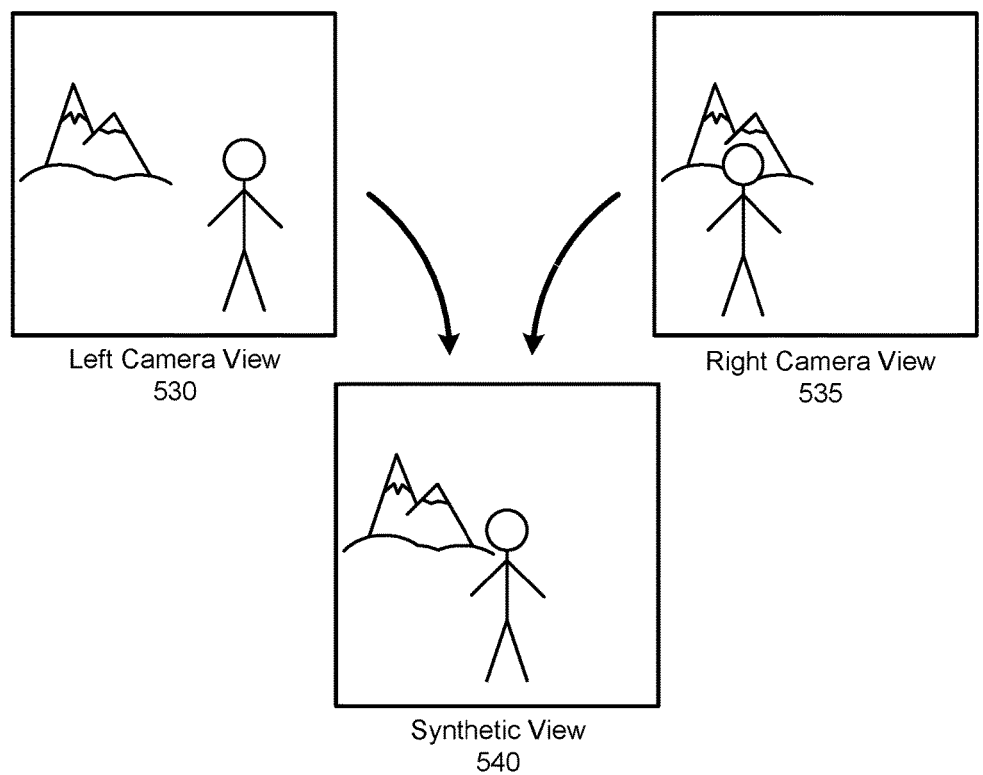
FIG. 5b is a line diagram illustrating example camera views and an example synthetic view, according to some embodiments.

FIG. 5a is a line diagram illustrating the generation of an example synthetic view based on a left camera view and a right camera view, according to some embodiments. Similarly, FIG. 5b is a line diagram illustrating example camera views and an example synthetic view, according to some embodiments. Diagram 500 includes a left camera 505, a right camera 510, a synthetic camera 515, optical flow shifts 520 and 525, left and right camera views 530 and 535, and a synthetic view 540.

As mentioned previously, in some implementations of a canvas generation system 110 a synthetic view is calculated by the novel view generation module 240 using input camera views captured from locations near to the synthetic camera location. For example, to calculate the synthetic view 540 for the synthetic camera 515, camera views 530 and 535 from the left camera 505 and the right camera 510 can be combined. Generating a synthetic view can be accomplished by shifting pixels from the left and right camera views 530 and 535 to appropriate positions in the synthetic view 540. For example, an amount to shift a pixel can be determined using information from an optical flow associating pixels in the left camera view 530 with pixels in the right camera view 535. In some implementations, the optical flow is an array of displacement vectors, for example, the optical flow can contain one vector for each pixel in the left camera view 530. In the embodiment of FIG. 5, the optical flow shifts 520 and 525 show the shift from the left and right camera views 530 and 535 to the synthetic view 540. The amount of the optical flow shifts 520 and 525 of each pixel of the left and right camera views 530 and 535 can depend on the position of the synthetic camera 515 relative to the left and right cameras 505 and 510.

Example left camera view 530 from left camera 505 shows a distant mountain and a person on opposite sides of the camera view. In contrast, right camera view 535 from right camera 510 shows the same elements of the person and the mountain in different positions in the camera view. The discrepancy in the positions of the person and mountain between the left and right camera views 530 and 535 is due to the perspective shift in camera views captured from the differing positions of the left and right cameras 505 and 510. While the distant mountain has remained in relatively the same position between the left and right camera views 530 and 535, the person has experienced a much greater positional shift between the left and right camera views 530 and 535. As the synthetic camera 515 is positioned in a similar orientation to and between the left and right cameras 505 and 510, objects in the synthetic view 540 should be in intermediate positions relative to the left and right camera views 530 and 535. For example, in the synthetic view 540, the person has moved an intermediate amount relative to both the left camera view 530 and the right camera view 535.

Figure 6:
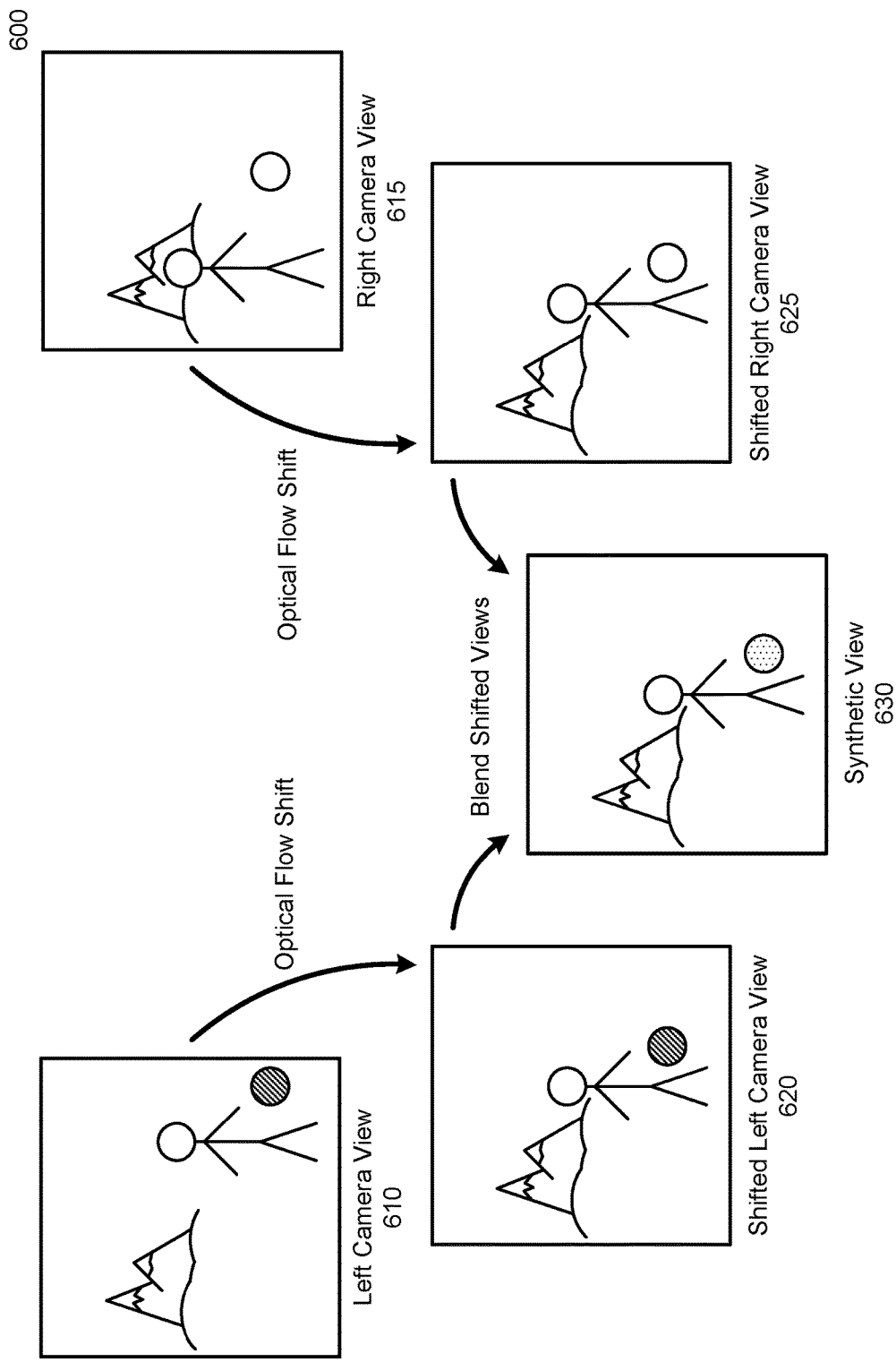
FIG. 6 is a line diagram illustrating a detailed example of the generation of an example synthetic view from example camera views, according to some embodiments.

FIG. 6 is a line diagram illustrating a detailed example of the generation of an example synthetic view from example camera views, according to some embodiments. Diagram 600 shows example camera views generated by the novel view generation module 240 at several stages of processing to generate a synthetic view 630 from a left camera view 610 and a right camera view 615. Diagram 600 includes the left and right camera views 610 and 615 as well as shifted left and right camera views 630 and 625, and the synthetic view 630.

The scene captured by each camera view in FIG. 6 includes three main objects, a mountain, a person, and a ball. In this embodiment, the mountain is considered a background object in the scene and is distant from the locations of the cameras capturing the input camera views, however, the person and ball are foreground objects and much closer to the cameras capturing the left and right camera views 610 and 615. As a result, the foreground objects have a larger displacement between the left camera view 610 and the right camera view 615 relative to the background object. The left camera view 610 and the right camera view 615 are input camera views that can be used to calculate the synthetic view 630. To generate the synthetic view 630 in this embodiment, the left camera view 610 is first shifted to the location of the desired synthetic view based on an optical flow. Each vector in the optical flow can indicate a displacement between corresponding pixels in the left camera view 610 and the right camera view 615. In the optical flow shift, the pixels of the left camera view 610 are shifted based on the optical flow and proportional to the relative location of the synthetic camera. Each pixel in the left camera view 610 can be shifted in a direction relative to a proportion of the corresponding optical flow vector for the pixel to determine the location of the pixel in the synthetic view. For example, if the synthetic camera is positioned halfway between the left and right cameras, each pixel in the left camera view 610 can be shifted by half the value of the vector corresponding to that pixel in the optical flow. Similarly, if the synthetic camera is located 10% of the way from the left camera to the right camera, each pixel in the left camera can be shifted 10% of the corresponding vector in the optical flow. The same shifting process can be applied to the right camera view 615 to get the shifted right camera view 625.

The shifted left and right camera views 620 and 625 each represent approximations of the synthetic view 630 using position information from both left and right camera views 610 and 615 when shifted using the optical flow. Because pixel intensity information can be inconsistent between different camera views and cameras, even cameras in the same configuration, the synthetic view 630 can be generated using pixel intensity information from both the left and right camera view 610 and 615. In some embodiments, the shifted left and right camera views 620 and 625 contain pixel intensity information from one of the original camera views. For example, the shifted left camera view 620 incorporates position information (in the form of the shift based on the optical flow) from both the left camera view 610 and the right camera view 615. However, the shifted left camera view 620 only incorporates pixel intensity information from the left camera view 610 as all pixel intensity values in the shifted left camera view 620 are inherited from the corresponding pixels in the left camera view 610, even if the position of the pixels has been shifted.

Differing pixel intensity information between corresponding points in two camera views can be caused by, for example, differing exposure or other settings between the cameras capturing the camera views. In the example of FIG. 6, the ball is a different shade in the left camera view 610 than in the right camera view 615, and these differences remain in the shifted left and right camera views 620 and 625. In the embodiment of FIG. 6, the shifted left camera view 620 and the shifted right camera view 625 are blended to generate the synthetic view 630. Blending camera views can comprise averaging or otherwise combining corresponding pixels in the each shifted left and right camera view, for example by averaging pixel intensity information across two corresponding pixels in each camera view. The shifted left and right camera views 620 and 625 can be blended proportionally based on the position of the synthetic camera to generate the synthetic view 630. In the example of FIG. 6, the ball in the synthetic view 630 is of an intermediate shade as a result of each pixel of the ball being proportionally blended from corresponding pixels of the shifted left camera view 620 and the shifted right camera view 625.

In other embodiments, a synthetic view 630 can be generated based on pixel intensity information from only one camera view, for example using only pixel intensity information from the camera view captured nearest to the synthetic camera location to generate the synthetic view. However, if only pixel intensity information from the nearest camera is used an abrupt shift or difference in the look of the synthetic views closer to one camera view when compared to the synthetic views closer to the other camera view.

In one example, a pixel value P is determined based on a proportional distance t of the synthetic camera from the left to the right camera (where t=1 represents the position of the left camera and t=0 represents the position of the right camera) using the shifted left camera view pixel value L and the shifted right camera pixel value R, where each shifted camera pixel value reflects the pixel value after a proportional optical flow using the proportional distance t:

$$P = t \times L + (1-t) \times R \quad \text{Equation 1}$$

In some cases, however, the shifted left camera view pixel values may differ by a significant amount. To account for potential differences in pixel magnitude, an additional term may be included to determine whether to favor the left or the right pixel color value. The additional term may be a normalization function N with parameters N(a, b, x, y), where a and b are pixel color values and x and y are normalization weights. In one example, normalization function N weights the parameters as follows:

$$N = a \frac{e^x}{e^x + e^y} + b \frac{e^y}{e^x + e^y} \quad \text{Equation 2}$$

In one embodiment, the parameters for the normalization function N are:
a=the pixel value of the shifted left camera L
b=the pixel value of the shifted right camera R
x=the proportional distance t+the magnitude of the optical flow of the left camera, $M_l$
y=(1−the proportional distance t)+the magnitude of the optical flow of the right camera, $M_r$.

To determine the portion of weight for the normalization function N, the similarity in pixel magnitude δ between left and right camera pixel values may be used to weigh the application of N, where a pixel magnitude δ equal to 1 represents identical pixel values and a pixel magnitude δ equal to 0 represents complete disparity in pixel values. Thus, in one example the pixel value using the proportional distance t is:

$$P = \delta(t \times L + (1-t) \times R) + (1-\delta)N \quad \text{Equation 3}$$

When applying the parameters above the normalization function, the pixel values may are given by equation 4:

$$P = \delta(t \times L + (1-t) \times R) + \quad \text{Equation 4}$$
$$(1-\delta)L\left( \frac{e^{(t+M_l)}}{e^{(t+M_l)} + e^{(1-t+M_r)}} + R \frac{e^{(1-t+M_r)}}{e^{(t+M_l)} + e^{(1-t+M_r)}} \right)$$

By adjusting for the magnitude of the optical flow, this function to determine pixel values favors combining the pixel values when the pixel values are similar, and weights the distance to a camera view when the pixel values differ. When the pixel values differ, the normalization term permits selection between the left and right pixels using the magnitude of the optical flow for each shifted pixel in addition to proportional distance from the camera view.

Figure 7:
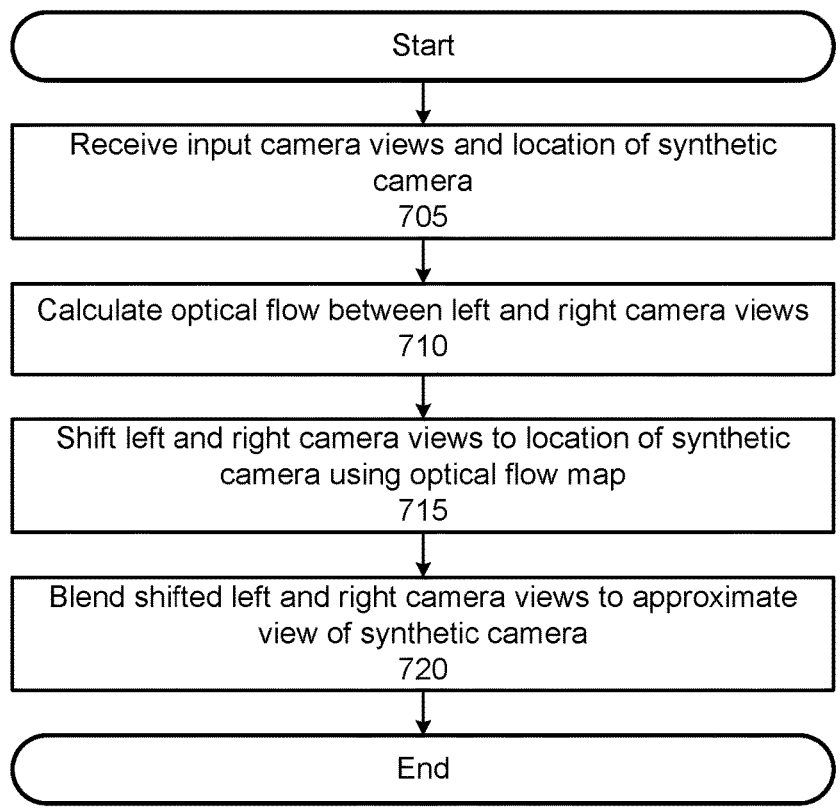
FIG. 7 is a flowchart illustrating a process for generating a synthetic view from input camera views, according to an embodiment.

FIG. 7 is a flowchart illustrating a process for generating a synthetic view from input camera views, according to an embodiment. The process 700 begins when left and right camera views and a location of a synthetic camera are received, for example, at the novel view generation module 240. Then, an optical flow between the received left and right camera views is calculated 710, such as by the optical flow calculation module 230. Using this optical flow, each received camera view can be shifted 715 based on the location of the synthetic camera. Then, the shifted left and right camera views are blended 720 to merge pixel intensity information and generate the final synthetic view based on the input camera views. This blending may be performed, for example, by equations 1 or 4 indicated above to blend the pixel intensity of each shifted camera.

Optical Flow Calculation

Optical flows, such as the optical flows used to generate synthetic views discussed above, are generated by the optical flow calculation module 250 in some embodiments. As mentioned previously, an optical flow associates corresponding points or pixels across multiple camera views. An optical flow between two camera views can be a vector field where each vector (hereinafter, optical flow vector) represents a displacement from one pixel in a first camera view to a corresponding pixel in the other camera view or a projection of the other camera view, such as a equirectangular or azimuthal projection. In other embodiments, an optical flow is a function or other type of translation, and an optical flow vector associated with a point represents the displacement between the point and its corresponding point when the optical flow function or mapping is evaluated. Optical flows can be calculated between any two camera views with corresponding pixels and, in some implementations, can be calculated between any number of camera views. For example, an optical flow can be calculated between two camera views in a horizontal plane and a third camera view, for example a fisheye camera positioned facing upwards. An optical flow can relate pixels (x, y) in a first image to pixels in a second image based on a function or mapping giving an offset (u, v). The corresponding pixel in the second image can be determined based on the functions or mappings u(x, y) and v(x, y), for example representing an x or y axis displacement from a given pixel in the first image to the corresponding pixel in the second image. In some implementations, the pixel corresponding to a pixel(x, y) in the first image can be the pixel (x+u(x, y), y+v(x, y)) in the second image.

In some embodiments, an optical flow is directional, having a primary camera view from which pixels are mapped to corresponding pixels in a secondary camera view. For example, each pixel in the primary camera view can be assigned a displacement vector storing the displacement between that pixel in the primary camera view and a corresponding pixel in the secondary camera view. In other implementations, optical flows are symmetric, assigning, for example, pixels in both camera views displacement vectors pointing to a corresponding pixel in the other camera views. A symmetric optical flow can also be created by combining two or more directional optical flows, for example calculating a directional optical flow for each camera view of a group of camera views. In some cases, a point in a one camera view will not have a corresponding point in one or more of the other camera views. For example an object can be occluded by another object in one camera view but not occluded and fully visible in another camera view of the same scene. In some embodiments, optical flow vectors are also assigned to pixels without a corresponding pixel in other camera views. For example, a pixel with no corresponding pixel in the other camera views can be assigned an optical flow vector based on a neighboring pixel's assigned optical flow vector, based on an average or median optical flow vector, or based on any other suitable method.

Figure 8:
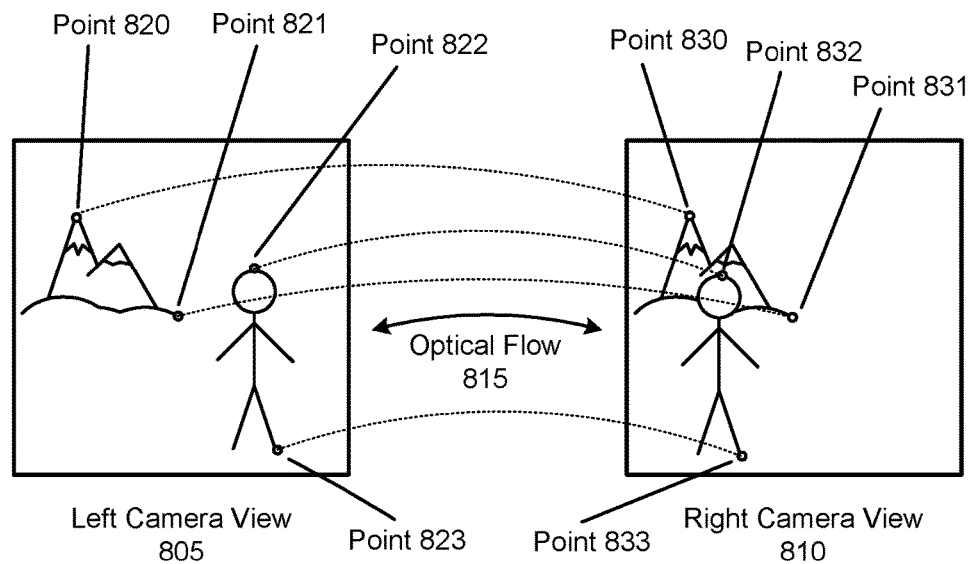
FIG. 8 is a line diagram illustrating optical flow vectors between example camera views, according to some embodiments.
Figure 8:
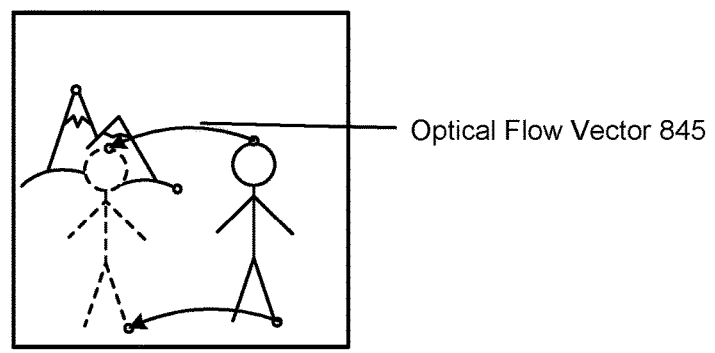

FIG. 8 is a line diagram illustrating optical flow vectors between example camera views, according to some embodiments. Diagram 800 includes a left camera view 805 and a right camera view 810, an optical flow 815, points 820-823 in the left camera view 805, points 830-833 in the right camera view 810, a combined camera view 840, and an optical flow vector 845.

In the embodiment of FIG. 8, the left camera view 805 and the right camera view 810 depict several shared objects, in this case a mountain and a person captured from two different locations. Because the left camera view 805 and the right camera view 810 share common objects, there are pixels representing the common objects in the left camera view 805 that correspond to pixels in the right camera view 810 also representing the common objects. For example, each of the points 820-823 can be associated with a pixel in the left camera view 805 corresponding with a pixel in the right camera view associated with the corresponding points 830-833. For example, the point 822 in the left camera view 805 and the corresponding point 832 in the right camera view 810 can represent corresponding pixels in the left and right camera views 805 and 810 both depicting the top of the person's head. In some embodiments, an optical flow such as optical flow 815 captures the correspondence between the pixels associated with the points 822 and 832.

The combined camera view 840 displays the right camera view 810 overlaid onto the left camera view 805 for example purposes. In the combined camera view 840 it is apparent that the positional shift between the left and right camera views 805 and 810 is not consistent for all objects common to both camera views. For example, the position displacement of the mountain between the left and right camera views 805 and 810 has less magnitude compared to the position displacement of the person between the same camera views. Differences in shift amounts between objects can be caused by perspective effects, for example due to differing distances to the camera between objects of the camera views. In the example of FIG. 8, the mountain is much further from the left and right cameras than the person, resulting in the positional displacement of the person being greater than the positional displacement of the mountain between the left and right camera views 805 and 810. The optical flow vector 845 is an example of a vector that can be included in the optical flow between the left camera view 805 and the right camera view 810. The optical flow vector 845 illustrates the correspondence between the point 822 in the left camera view 805 and the point 832 in the right camera view by showing the displacement between them.

Calculation of an optical flow can be accomplished by a variety of methods. For example, calculation of an optical flow can begin by establishing a variational optimization problem to determine the optical flow between the two images. The optimization problem can include a variety of terms, such as a data term measuring the intensity of a pixel or the intensity of the gradient of a pixel in comparison to the corresponding pixel or gradient in another image, a regularization term measuring, for example, the smoothness of the optical flow field, or any other suitable term. For example, a variational optimization equation relating pixels (x, y) in a first image to pixels (x+u(x, y), y+v(x, y)) in a second image can be presented as follows:

$$\varepsilon(u, v) = \int_x \int_y \left\{ \begin{array}{l} |I_1(x, y) - I_2(x + u(x, y), y + v(x, y))|^P + \\ \|\nabla I_1(x, y) - \nabla I_2(x + u(x, y), y + v(x, y))\|^P + R(u, v) \end{array} \right\} dx dy$$

Equation 5

The example variational optimization equation (Equation 5) above includes a data term $|I_1(x, y) - I_2(x+u(x, y), y+v(x, y))|^P + \|\nabla I_1(x, y) - \nabla I_2(x+u(x, y), y+v(x, y))\|^P$ measuring the absolute value of the difference in pixel intensity I or color between a pixel in the first image and its corresponding pixel in the second image. The data term for this example variational optimization equation further includes a gradient consistency $\|\nabla I_1(x, y) - \nabla I_2(x=u(x, y), y+v(x, y))\|^P$ term measuring the difference in the gradients $\nabla I_1$ of the two images. Finally, this equation includes a regularization term R(u, v). Minimization of the variational optimization equation indicates that the optical flow is optimized relative to the specific parameters of the variational optimization problem. In other embodiments, the variational optimization problem can include additional terms, for example as shown in Equation 6 below.

$$\vec{f}^* = \arg\min_{\vec{f}} \int \int \left\{ \begin{array}{l} \|G * \nabla I_0(x, y) - G * \nabla I_1(\langle x, y \rangle + \vec{f}(x, y))\| + \\ \lambda_t \|\vec{f}(x, y) - \vec{f}_{prev}(x, y)\|^2 + \\ \lambda_s \left( \begin{array}{l} \|\vec{f}(x, y) - \vec{f}(x+1, y)\|^P + \|\vec{f}(x, y) - \vec{f}(x-1, y)\|^P + \\ \|\vec{f}(x, y) - \vec{f}(x, y+1)\|^P + \|\vec{f}(x, y) - \vec{f}(x, y-1)\|^P \end{array} \right) + \\ \lambda_m \left( \sum_{i, j \in N(x, y)} |u(x, y) - u(i, j)| + |v(x, y) - v(i, j)| \right) + \\ \lambda_d W(\alpha_0(x, y), \alpha_1(x, y), \varepsilon(x, y)) \|\vec{f}(x, y) - G_d * \vec{f}(x, y)\|^2 \end{array} \right\} dx dy$$

Equation 6

Where G and $G_d$ are Gaussian kernels, $\alpha_0$ and $\alpha_1$ are alpha channels, $\varepsilon$ is error in pixel intensity values between two corresponding points, and W is a sigmoid.

Equation 6 shows a second example of a variational optimization problem. Equation 6 includes a data term $\|G*\nabla I_0(x, y) - G*\nabla I_1(\langle x, y \rangle + \vec{f}(x, y))\|$ comparing blurred versions (G*) of the gradients of pixels in the first image and pixels in the second image, a temporal regularization term $\lambda_t \|\vec{f}(x, y) - \vec{f}_{prev}(x, y)\|^2$ comparing the current optical flow to a previous optical flow, a lp smoothing $$\text{term } \lambda_s \left( \begin{array}{l} \|\vec{f}(x, y) - \vec{f}(x+1, y)\|^P + \|\vec{f}(x, y) - \vec{f}(x-1, y)\|^P + \\ \|\vec{f}(x, y) - \vec{f}(x, y+1)\|^P + \|\vec{f}(x, y) - \vec{f}(x, y-1)\|^P \end{array} \right),$$

a median filtering term $\lambda_m(\Sigma_{i,j \in N(x,y)}|u(x, y)-u(i, j)|+|v(x, y)-v(i, j)|)$ taking the absolute value difference of median pixel intensity values, and a weighted diffusion term $\lambda_d W(\alpha_0(x, y), \alpha_1(x, y), \varepsilon(x, y))\|\vec{f}(x, y)-G_d*\vec{f}(x, y)\|^2$ which measures the difference in pixel intensity values blurred based on error in the pixel intensity values. The temporal regularization, median filtering, and weighted diffusion terms will be discussed in greater detail below.

This variational optimization problem can then be solved to determine the optical flow. In some embodiments the variational optimization problem is approximated by minimizing the optimization equation constructed using the data and regularization terms. For example, the optimization equation can first be transformed into a non-linear system of partial differential equations using the iterative Euler-Lagrange method. The non-linear system can then be linearized and solved using other iterative methods. For example, the Gauss Seidel, Jacobi, or successive over relaxation (SOR) methods can be employed to solve the linearized system of equations approximating the variational optimization problem. In some implementations, key points or pixels within the camera views can be separately matched using a key point matching algorithm such as ORB, AKAZE, or BRISK to generate accurate matches between pixels corresponding to the key points. The optical flow calculation module 250 can use the calculated key point matches to influence the variational optimization problem towards solutions including optical flow vectors for the key points similar to the previously calculated key point matches. For example, between iterations of solving the variational optimization problem the optical flow can be influenced toward the key point matches, for example, by using splatting.

Alternatively, the variational optimization problem can be solved by using iterative methods without transforming the optimization problem into a linearized system of equations. To solve the variational optimization problem of generating an optical flow field, iterative methods can be applied to an initialized vector field representing the optical flow for each pixel of one or more camera views. The vector field can be initialized using a variety of methods, for example each optical flow vector can be randomly initialized, the entire vector field can be initialized to a uniform value, or any other suitable method can be used. In one embodiment, the optical flow is iteratively performed on an image "pyramid" of lower to higher resolution images. An optical flow is first calculated for low resolution downsampled versions of the images. This resulting initial optical flow can then be scaled up, including proportionally adjusting the magnitude of each optical flow vector, and used to initialize the optical flow for higher resolution versions of the images. Each previous optical flow can be used to initialize the optical flow for progressively higher resolution versions of the images, until the full resolution optical flow is calculated. Conceptually, this is similar to calculating the optical flow for progressively smaller regions of the images, as each pixel in a downsampled version of an image can represent a region in the original image.

During the iterative process, the optical flow can be optimized on a per-pixel or per-region basis. In one implementation of an iterative process to determine an optical flow, the optical flow vector for each pixel or region in a camera view is individually analyzed to iteratively determine a more optimal corresponding pixel in one or more other camera views. However, in implementations individually analyzing a small region or individual pixel, image quality variations such as noise, dust, or other imperfections in one or more of the camera views can impede the ability of the iterative process to associate a pixel with its correct corresponding pixel. For example, the most optimal corresponding pixel for a certain pixel may be obscured by noise, leading to a less optimal corresponding pixel being selected. To address this issue, in some embodiments median filtering, blurring, denoising, or other suitable image processing techniques are applied to the input camera views prior to the application of the iterative methods for calculation of the optical flow. After the iterative process is completed, the resulting optimized optical flow can be used in the calculation of a synthetic view or canvas view.

Figure 9:
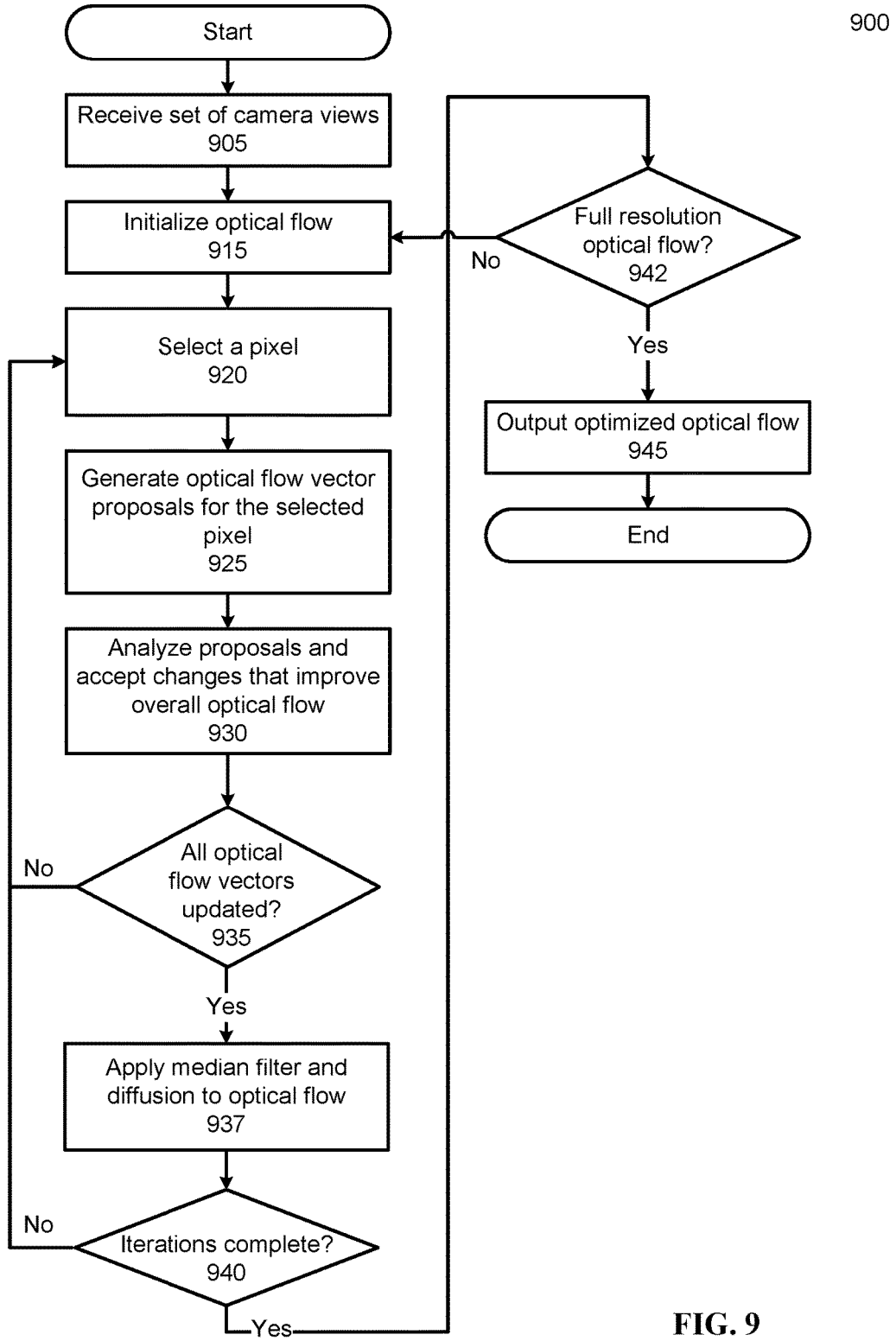
FIG. 9 is a flowchart illustrating an example process for calculating an optical flow between two camera views, according to some embodiments.

FIG. 9 is a flowchart illustrating an example process for calculating an optical flow between two camera views, according to some embodiments. The process 900 outlines an example iterative method for generating an optical flow between a left camera view and a right camera view. In other embodiments, similar techniques can be used to generate an optical flow between more or different camera views, such as an optical flow between three camera views or an optical flow between multiple camera views in any orientation, for example a top camera view and a bottom camera view.

The process 900 begins when a set of camera views are received 905 at the optical flow calculation module 250. For example, the optical flow calculation module 250 can receive a primary camera view and a secondary camera view or a left and right camera view. In some embodiments, the received camera views are processed, for example by denoising, median filtering, or blurring, to mitigate potential image quality differences between corresponding pixels between the camera views such as noise in one or more camera views. The process 900 continues by initializing 915 the optical flow for the set of camera views. For example, the optical flow can be initialized to a random optical flow, a zero magnitude optical flow, or to any other suitable optical flow. For example, in implementations using a pyramid type initialization, the optical flow can be initialized to a scaled up version of an optical flow calculated using a lower resolution version of the camera views. In the process 900, the initialized optical flow can then be optimized using iterative methods.

To begin each iteration, a pixel is selected 920 out of a camera view, for example, the top left pixel of the left camera view. In some implementations, pixels are selected in a pattern based on iteration and the optical flow vector corresponding to each pixel is updated prior to moving on to the next pixel. For example, in the first iteration pixels can be selected starting with the top left corner pixel and proceeding sequentially to the lower right corner pixel. In some embodiments, subsequent iterations select pixels in a different order. For example, the second iteration can start with the lower right corner pixel and proceed sequentially to the top left corner pixel. According to other implementations, pixels can be selected randomly, starting at a central pixel, or in any other suitable pattern. Tables 1-3 below show several example patterns for selecting a sequence of pixels, which may traverse the pixels in the image.

TABLE 1

| | | |
|---|---|---|
| 1 | 2 | 3 |
| 4 | 5 | 6 |
| 7 | 8 | 9 |

TABLE 2

| | | |
|---|---|---|
| 9 | 8 | 7 |
| 6 | 5 | 4 |
| 3 | 2 | 1 |

TABLE 3

| | | |
|---|---|---|
| 7 | 8 | 9 |
| 6 | 1 | 2 |
| 5 | 4 | 3 |

Next, for the selected pixel one or more flow vector proposals are generated 925. Flow vector proposals are alternate optical flow vectors associated with that pixel and can be generated by any number of suitable techniques. For example, a flow vector proposal can be generated randomly or based on a gradient descent calculated for a subset of the terms of the variational optimization problem. Flow vector proposals can also be generated by random perturbation of the current flow vector, or be copied from flow vectors corresponding to adjacent or nearby pixels. In one embodiment, four flow vector proposals are generated for the selected pixel; a random flow vector, a flow vector generated by gradient descent, a copy of the flow vector assigned to the upper neighbor of the selected pixel, and a copy of the flow vector assigned to the left neighbor of the selected pixel. Each flow vector proposal is then analyzed 930 to determine if that vector proposal improves the optimization of the optical flow when compared to the other proposals and the current optical flow vector. The improvement can be determined by, for example, comparing the output of the variational optimization problem, and determining if it has decreased therefore being brought closer to a minimum. In some embodiments, the intensity gradient of each image can be blurred when input into the variational optimization problem. Proposals that improve the optimization are then accepted and become the new optical flow vector associated with the selected pixel. The process 900 then proceeds to the next pixel in sequence and when all the flow vectors in the optical flow have been updated 935, a median filter or diffusion filter, for example a Gaussian blur filter, can be applied 937 to the updated optical flow to lessen the effects of outliers in the optical flow field. Median filtering and diffusing filtering can improve the consistency or smoothness of an optical flow field by removing outliers in the optical flow field that do not align with the optical flow vectors of nearby pixels. In some implementations, the diffusion filter can apply a weighted diffusion, such as a Gaussian blur or other type of blur, to each optical flow vector for each pixel based on the error in the pixel intensity values between that pixel and its corresponding pixel. For example, a fully blurred optical flow can be blended with the pre-blur optical flow based on error in the pixel intensity values. Optical flow vectors for pixels with more error in pixel intensity values can weigh the blurred optical flow more heavily than pixels with less error in the pixel intensity values for corresponding pixels. In some embodiments, for example an embodiment using the variational optimization equation of Equation 6, median filtering and weighted diffusion can be incorporated as terms in the variational optimization problem. Then, the process 900 moves on to the next full iteration of the iterative process. At this point, after all iterations are complete 940 and if the optical flow is not a full resolution optical flow 942, for example if pyramid type initialization of the optical flow is used, the process is returned to optical flow initialization 915 to continue iteration based on higher resolution camera views with an optical flow initialized using the current optical flow. Otherwise, after all iterations are complete 940, the optimized optical flow is output 945.

In one variation of the optical flow calculations, the intensity values of pixels may be blurred to soften hard edges between images. In addition, the image intensity gradients themselves may also be blurred during iterations. By performing this blur, the optical flow analysis may be more robust with respect to noise and sharp edges that may appear differently across different images.

In another variation, the optical flow initially incorporates a previous frame's optical flow for a camera to another camera. For example, in some cases the cameras may be capturing video comprising a series of frames synchronized across cameras. The prior frame's optical flow may be used in the optical flow for a current frame. The current frame may use a previous frame's optical flow as an initial solution for a first iteration, or a solution may be found for the current frame, and the solution for the current frame is combined with the prior frame's optical flow to determine the current frame optical flow. This permits temporal regularization of the optical flow across more than one image. In some implementations a temporal regularization term can be included in the variational optimization equation.

Canvas View Generation

According to some embodiments, the light information approximation module 260 generates canvas views based on the synthetic views generated by the novel view generation module 240 and the optical flows generated by the optical flow calculation module 250. For example, the light information approximation module 260 can assemble a canvas view out of regions taken from specifically generated synthetic views. In some embodiments, the light information approximation module 260 requests the synthetic views required for the generation of the canvas view from the novel view generation module 240. Similarly, the light information approximation module 260 can request any needed optical flows from the optical flow calculation module 250. Alternatively, optical flows can be automatically calculated or requested by the novel view generation module 240 during the generation of synthetic views.

As mentioned previously, canvas views can be generated in order to approximate light information at a certain viewpoint or set of viewpoints. Canvas view generation can begin by segmenting the canvas view into a set of regions or pixels for which the canvas view will be calculated. In some embodiments, light information approximation is performed on a per-pixel basis where each pixel of a canvas view is associated with a light ray in the light information approximation. Similarly, each region of the canvas view can be associated with a viewpoint used, for example, to determine light information relevant to that region of the canvas view. For example, each pixel can be calculated based on a synthetic view from a synthetic camera location specific to that pixel. In other embodiments, calculation of a canvas view approximating a light information at a viewpoint is based on regions of the canvas view larger than a single pixel. For example, in configurations using a single plane of cameras, such as in the case of a single ring of cameras oriented outwards, light information approximation can be based on one pixel wide columns of pixels in the canvas view. A synthetic view can be calculated for each of canvas view regions and the relevant light information used to generate a canvas view. In some implementations, regions larger than a single pixel or column of pixels are used to lessen computational load on the canvas view generation system 110. For example, using fewer regions can require fewer synthetic views to be calculated, as each region can require the calculation of a synthetic view unique to that region. For example, regions of a canvas view can be square regions, column regions wider than 1 pixel, or any other suitable subset of pixels in a canvas view. Once all of the needed synthetic views are calculated a specific region of each synthetic view can be extracted and combined to form a canvas view approximating light information at a viewpoint.

Figure 10:
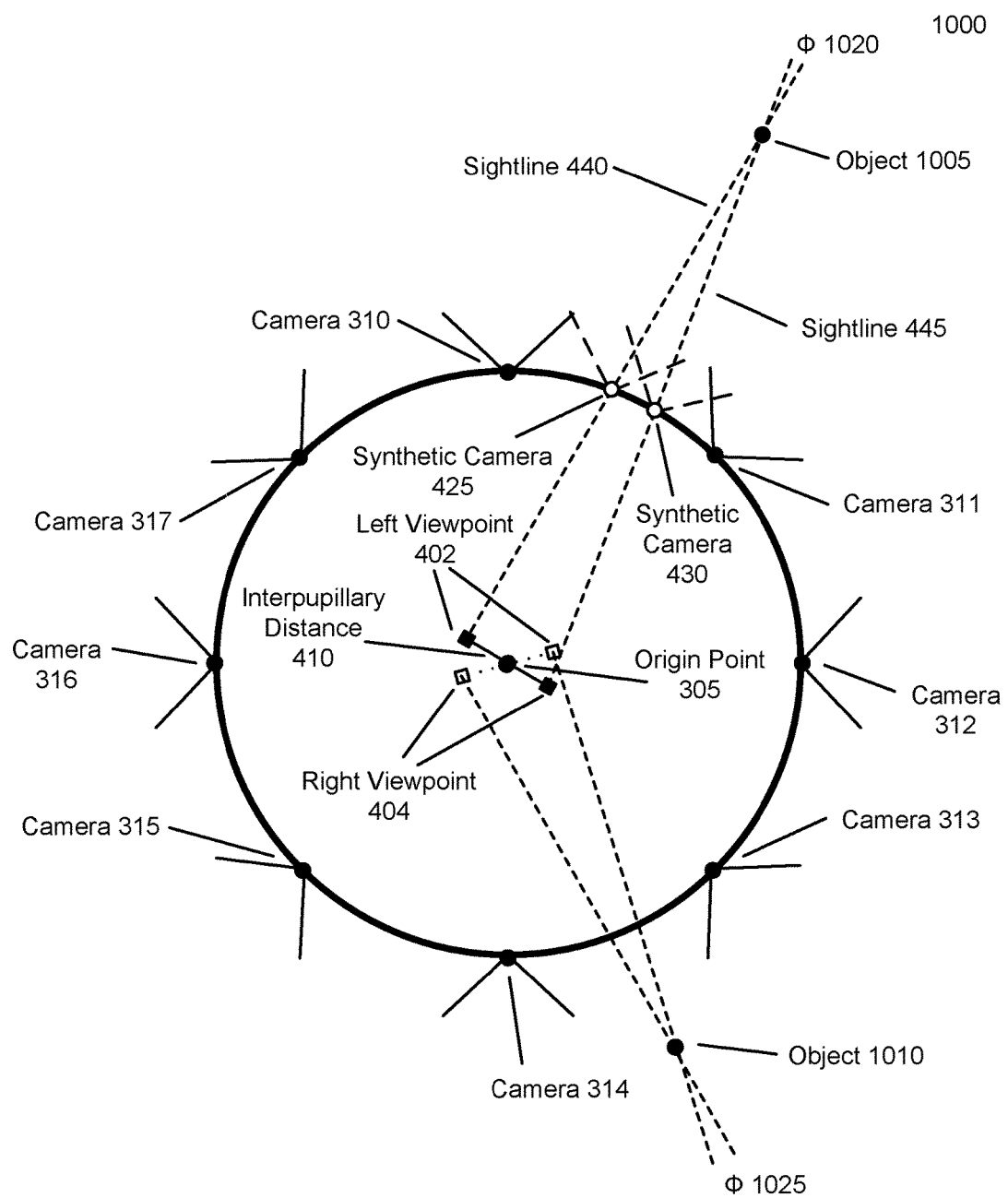
FIG. 10 is a line diagram illustrating multiple objects and an example image capture system, according to some embodiments.

FIG. 10 is a line diagram illustrating multiple objects and an example image capture system, according to some embodiments. Diagram 1000 includes an origin point 305, left and right viewpoints 402 and 404, interpupillary distance 410, cameras 310-317, synthetic cameras 425 and 430, sightlines 440 and 445, an object 1005 associated with an angle 1020, and another object 1010 associated with an angle 1025. In some embodiments, objects 1005 and 1025 are physical objects located in the scene, but the objects 1005 and 1025 can also be at a zero parallax distance within the scene, or any other point in the scene.

Diagram 1000 represents an example scene in which an image capture system 105 captures a scene including multiple objects 1005 and 1025. To recreate this scene on a client VR device 115, the canvas view generation system 110 can generate canvas views intended for display to the left and right eyes of a user. Each canvas view can approximate the light information at two sets of viewpoints corresponding to the left and right eyes of a user of the client VR device 115. The left viewpoint 402 and the right viewpoint 404 can represent example viewpoints of the left and right sets of viewpoints for which canvas views will be calculated. In this embodiment, the left and right viewpoints 402 and 404 are separated by an interpupillary distance 410. To approximate light information at a viewpoint, such as the left viewpoint 402 or the right viewpoint 404, the light information approximation module 260 can assemble a canvas view out of specific regions in camera views and synthetic views capturing the relevant light information at that viewpoint.

In the embodiment of FIG. 10, each camera 310-317 has a defined field of view and none of the cameras are configured to fully capture all the light information of the scene, for example no camera 310-317 can capture light information from both object 1005 and object 1010. Synthetic views, such as the synthetic views from the synthetic cameras 425 and 430 can be generated to capture specific pieces of light information not directly captured by the cameras 310-317. However, an individual synthetic view generated for this purpose does not capture all the light information needed to generate a canvas view approximating the light information at a viewpoint.

In some embodiments, each camera 310-317 or synthetic camera 425 and 430 can capture a subset of the light information needed to generate an appropriate canvas view. For example, the object 1005 can be associated with a specific point of light information. In this embodiment, the synthetic camera 425 generates a synthetic view containing light information, for example information on the light ray travelling from the object 1005 to the left viewpoint 402, as signified by the sightline 440 from object 1005 which intersects both the synthetic camera 425 and the left viewpoint 402. Information about the light ray travelling from object 1005 to the right viewpoint 404 can be similarly captured by the synthetic camera 430, as it intersects with the sightline 445. The location of the exact pixels or regions within the synthetic views containing light information about relevant light rays can be calculated, for example using trigonometric methods. In some embodiments, the pixels in the synthetic view of the synthetic camera 425 capturing information about the light ray between the object 1005 and the left viewpoint 402 are calculated based on the field of view and resolution of the synthetic view, the angle of the sightline 440 relative to the synthetic camera 425 and the left viewpoint 402, and the relative positions of the synthetic camera 425 and the left viewpoint 402.

Figure 11:
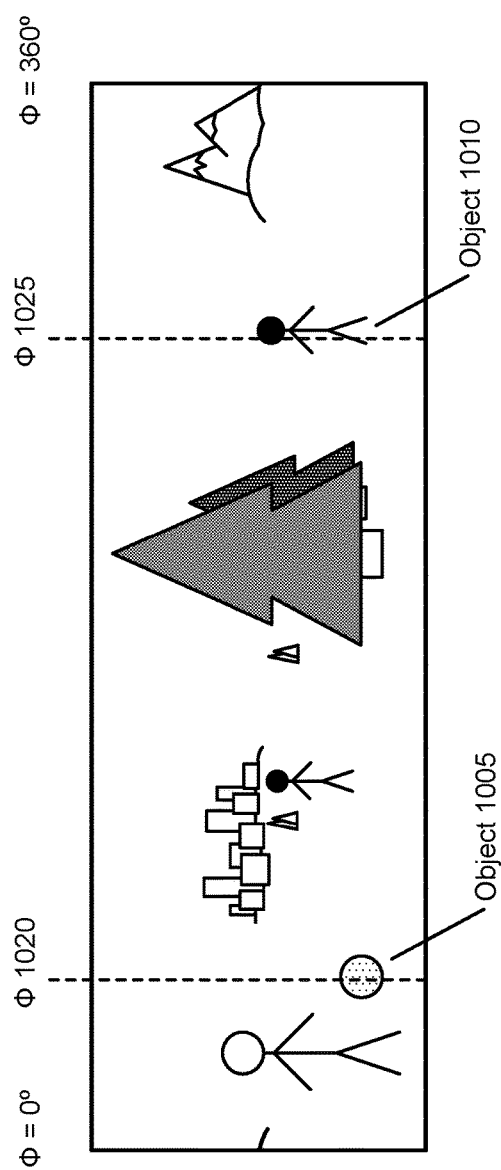
FIG. 11 is a line diagram illustrating an example canvas view, according to some embodiments.

FIG. 11 is a line diagram illustrating an example canvas view, according to some embodiments. For example, the canvas view 1100 of FIG. 11 can represent an example canvas view generated based on a set of original camera views captured by the cameras 310-317 shown in FIG. 10. The canvas view 1100 is an example canvas view approximating light information at a viewpoint, specifically, the canvas view 1100 includes two objects 1005 and 1010 each associated with an angle 1020 and 1025.

For example, the regions associated with Φ 1020 and Φ 1025 in the canvas view 1100 can approximate light information about the objects 1005 and 1010 in the scene of FIG. 10. Each of the associated regions of the canvas view 1100 can be generated based on light information from the synthetic view of an appropriate synthetic camera. For example, the region associated with Φ 1020 can be generated from a specific region of the synthetic camera 425.

Figure 12:
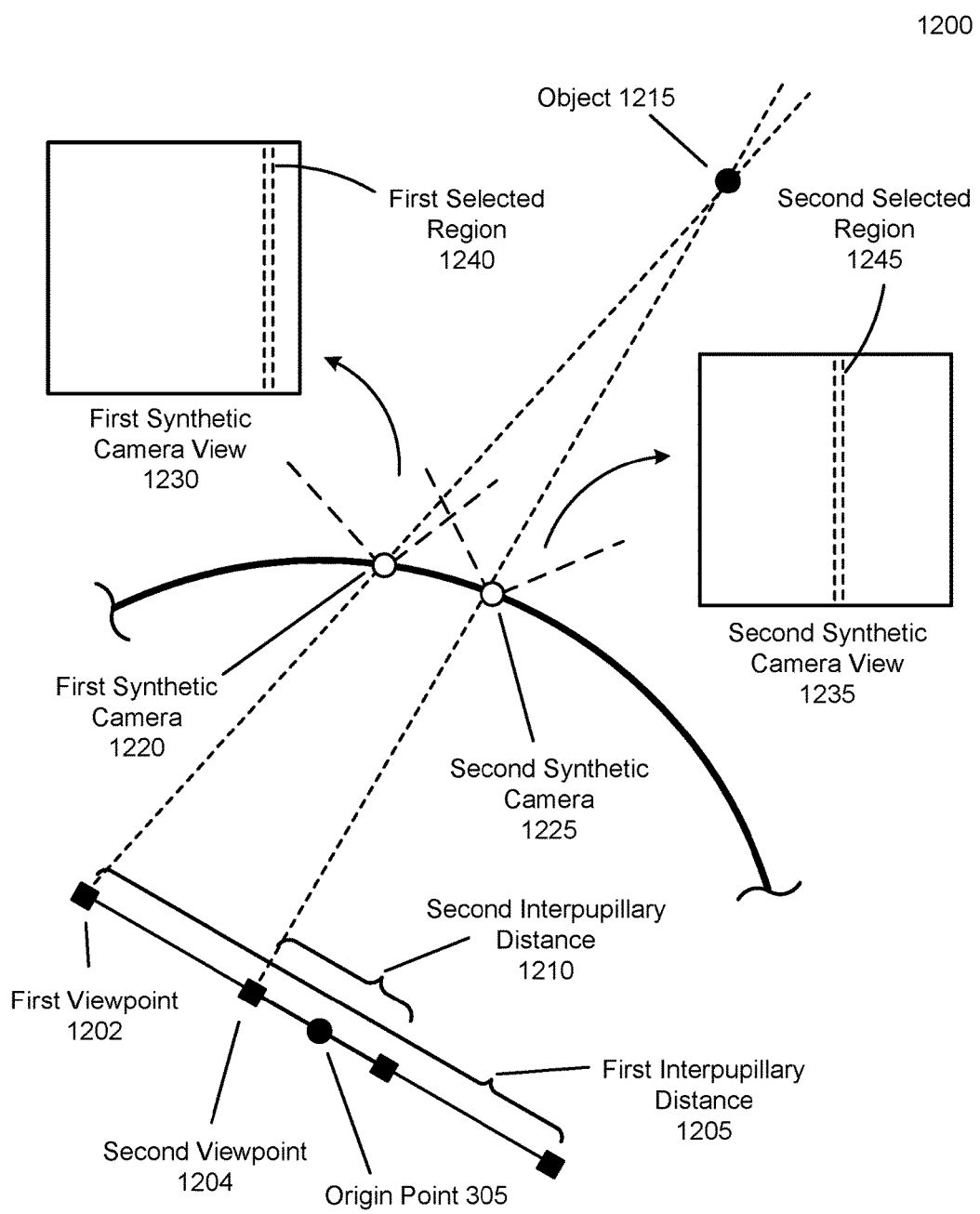
FIG. 12 is a line diagram illustrating the effect of changing interpupillary distance on views of an object, according to an embodiment.

FIG. 12 is a line diagram illustrating the effect of changing interpupillary distance on views of an object, according to an embodiment. Diagram 1200 includes an origin point 305, a first viewpoint 1202, a second viewpoint 1204, first and second interpupillary distances 1205 and 1210, an object 1215, first and second synthetic cameras 1220 and 1225, first and second synthetic views 1230 and 1235, and first and second selected regions 1240 and 1245 within the synthetic views.

In some embodiments, an interpupillary distance determines the location of viewpoints from which canvas views are generated. For example, the first interpupillary distance 1205 and the second interpupillary distance 1210 can be two interpupillary distances used to inform the location of viewpoints for canvas view generation. The first viewpoint 1202 can be associated with the first interpupillary distance 1205 and similarly the second viewpoint 1204 can be associated with the second interpupillary distance 1210. Similarly, differing viewpoints can require different light information to approximate the light information at the viewpoint, and can consequently require different synthetic views to be calculated.

Synthetic camera locations such as the locations of the first synthetic camera 1220 and the second synthetic camera 1225 can be calculated based on several factors. For example, the first synthetic camera 1220 can capture light information about the object 1215 as viewed from the first viewpoint 1202 as the first synthetic camera is positioned to intercept the light ray travelling from the object 1215 to the first viewpoint 1202 and is oriented to capture the relevant light information. Similarly, the second synthetic camera 1225 is positioned to capture light information about the object 1215 as from the second view point 1204. Due to the differing locations of the first and second viewpoints 1202 and 1204, for example based on the selection of a different interpupillary distance, the first and second synthetic cameras 1220 and 1225 both capture light information for the object 1215 but from different locations depending on the viewpoint location.

Additionally, there are many possible synthetic camera locations and orientations capturing the relevant light information for a specific viewpoint of a canvas view, for example, each synthetic camera location along the light ray or rays to be captured. The location and orientation of the first synthetic camera 1220 can be chosen based additionally on factors such as an ease of calculation of the synthetic view, consistency with other synthetic camera locations or camera locations of an image capture system 105, or based on any other suitable reason. For example, each synthetic camera can have a location chosen on a ring 303 oriented directly outward to maintain consistency with actual cameras mounted on an image capture system 105. Similarly, synthetic camera location can be chosen based on ease of calculation, for example, choosing a synthetic camera location closest to nearby existing camera views.

Once a synthetic camera location is determined, calculation of which pixels or regions within a synthetic view contain relevant light information can be based on a variety of factors. The angle of the desired light information relative to the synthetic view, the field of view and lens distortion of the camera view, and the position of the camera capturing the camera view can all effect which regions within a synthetic view contain relevant light information for the current viewpoint. For example, the locations of the object 1215, the first viewpoint 1202, and the orientation of the first synthetic camera 1220 can result in the first selected region 1240 of the first synthetic camera view 1230 containing the desired light information. In this example, the position of the first synthetic region 1240 is close to the right edge of the first synthetic camera view 1230 as the angle of the desired light information is close to the right edge of the field of view of the first synthetic camera view 1220. Similarly, the locations of the object 1215 relative to the second viewpoint 1204 and the orientation of the second synthetic camera 1225 also determine which region of the second synthetic camera view 1235 contains the desired ligh information. I the example of diagram 1200, the second selected region 1245 within the second synthetic camera view 1235 contains the desired light information.

In some embodiments, trigonometric calculations are applied to determine the location of a specific region within a synthetic view.

Figure 13:
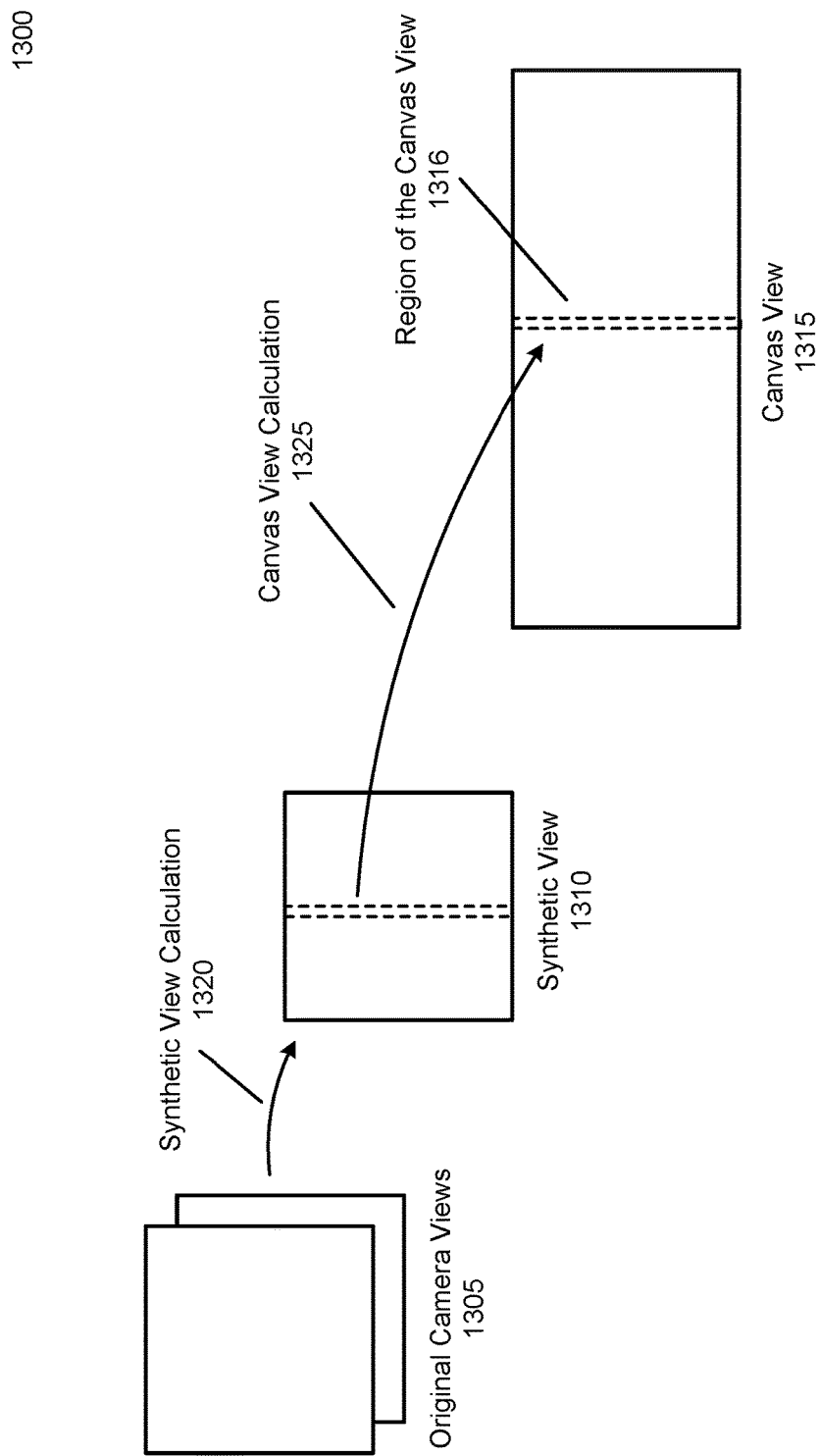
FIG. 13 is a line diagram illustrating an example process for calculating a canvas view based on camera views, according to one embodiment.

FIG. 13 is a line diagram illustrating an example process for calculating a canvas view based on camera views, according to one embodiment. Diagram 1300 includes original camera views 1305, a synthetic view 1310, a canvas view 1315, a region of the canvas view 1316, a synthetic view mapping 1320, and a canvas view calculation 1325.

In the embodiment of FIG. 13, the original camera views 1305 can be a set of camera views captured by the image capture system 105 that canvas view generation system 110 uses to calculate a canvas view. For example, the original camera views 1305 can include camera views with overlapping fields of view, allowing the set of original camera views 1305 to be blended into a canvas view. To calculate the region of the canvas view 1316, the corresponding synthetic view 1310 capturing the light information for the region of the canvas view 1316 can be calculated from the original camera views 1305 using a synthetic view calculation 1320. In some embodiments, the synthetic view calculation 1310 is performed by the novel view generation module 240 based on the original camera views 1305 and an optical flow. Once the synthetic view 1310 is calculated for the needed synthetic camera, the region of the canvas view 1316 can be calculated using the canvas view calculation 1325. As described above, the location of the region within the synthetic view 1310 containing light information for the region of the canvas view 1316 can be calculated based on the relative positions of the synthetic camera and the associated viewpoint of the canvas view 1315 by trigonometric methods.

In some embodiments, the process of FIG. 13 is repeated sequentially for each region of the canvas view 1315 until all regions are calculated. However, in other implementations, other calculation processes can be used to generate the canvas view, for example, a fixed set of synthetic views can be calculated or the needed synthetic views are determined and calculated at once before the canvas view 1315 is assembled. Effectively, the process of FIG. 13 involves two steps or mappings altering the pixel intensity information of the original camera views 1405, first, mapping pixels from the original views 1305 into a set of synthetic views 1310 and then mapping the pixels from the set of synthetic views 1310 into the canvas view 1315. A mapping can be a pixel-level operation generating pixels in one view based on specific pixels in another view. The process of FIG. 13 is effective, but can result the calculation of many extraneous regions of the synthetic view 1310 not used in the canvas view 1315, for example, calculating pixels in a synthetic view that will not be incorporated into the final canvas view. As the complete synthetic view 1310 is generated prior to the calculation of which region within the synthetic view is contains the relevant light information this method can introduce additional processing overhead into the calculation of a canvas view 1315.

Figure 14:
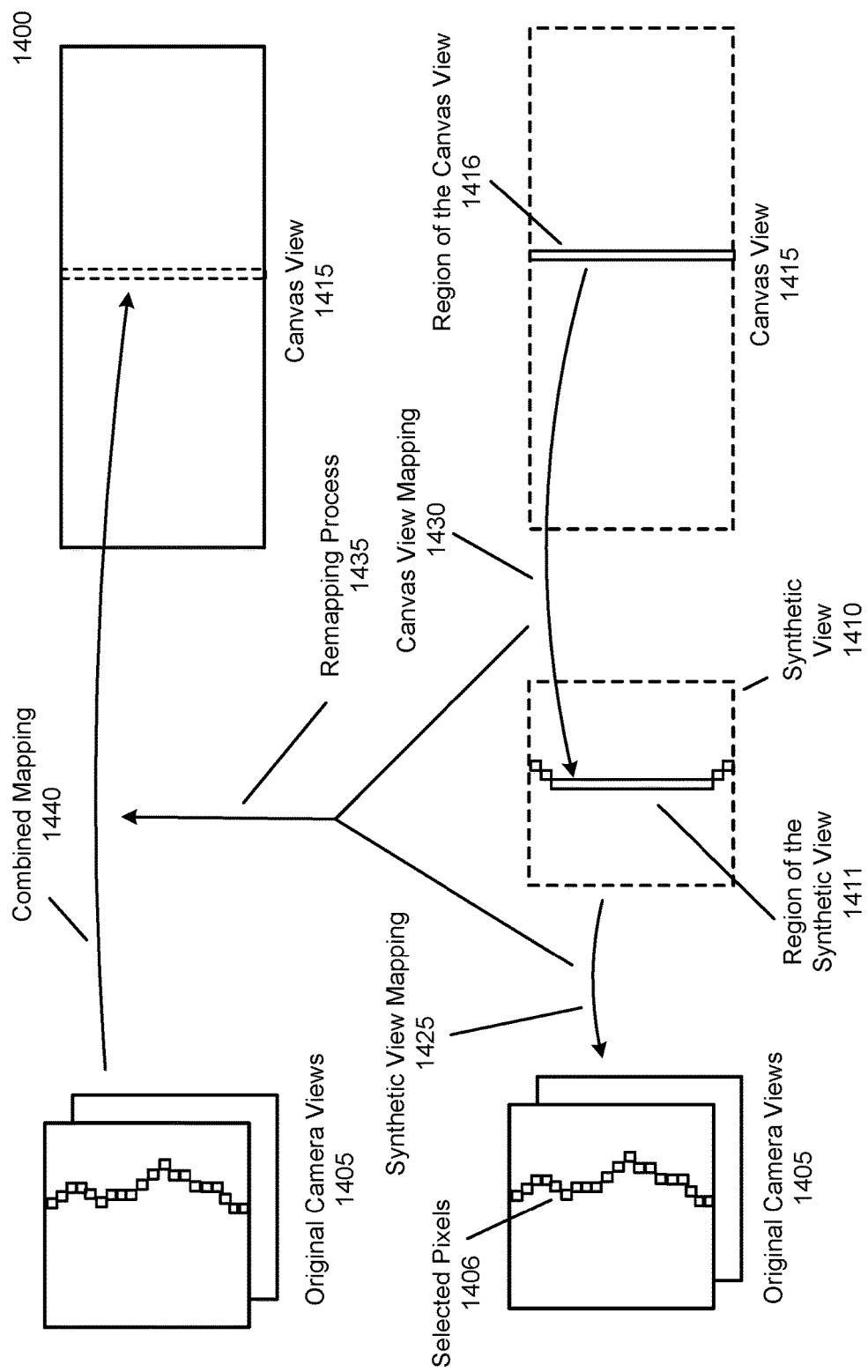
FIG. 14 is a line diagram illustrating a second example process for calculating a canvas view based on camera views, according to one embodiment.

FIG. 14 is a line diagram illustrating a second example process for calculating a canvas view based on camera views, according to one embodiment. Diagram 1400 includes original camera views 1405, selected pixels 1406, a synthetic view 1410, a canvas view 1415, a region of the synthetic view 1411, a region of the canvas view 1416, a synthetic view mapping 1425, a canvas view mapping 1430, a remapping process, 1435, and a combined mapping 1440. The process of FIG. 14 can reduce the processing power required to calculate a canvas view 1410 compared to the process of FIG. 13 by both reducing the number of calculation steps performed on pixels in camera view, and by reducing the calculation of unnecessary pixels that will not eventually be incorporated into the canvas view 1410.

In the implementation of FIG. 14, to calculate a region of the canvas view 1415 a combined mapping 1440 is applied to the original camera views 1405, directly generating the region of the canvas view 1315 from relevant pixels of the original camera views 1405. In some embodiments, the combined mapping 1440 is a vector field that maps each pixel or region in the canvas view 1415 to one or more pixels or regions in the original camera views 1405, for example represented by the selected pixels 1406. In some implementations, multiple pixels in the original camera views 1405 can be mapped to a single pixel in the canvas view, for example, a pixel in the canvas view 1415 can be associated with a blend of 75% of a pixel in a first camera view of the original camera views 1405 and 25% of another pixel in a second camera view of the original camera views. The combined mapping 1440 can allow the pixel intensity values of the canvas view 1415 to be calculated from pixel intensity values of the selected pixels 1406 within the original camera views 1405 in a single mapping operation.

In some implementations, the combined mapping 1440 is generated based on a canvas view mapping 1430 and a synthetic view mapping 1425. The canvas view mapping 1430 can be a mapping associating the region of the canvas view 1416 with a corresponding region of the synthetic view 1411 and the synthetic view mapping 1425 can be a mapping associating pixels in the original camera views 1405 with the region of the synthetic view 1411. The synthetic view mapping 1425 and the canvas view mapping 1430 can be generated by techniques similar to the synthetic view calculation 1320 and the canvas view calculation 1325 of FIG. 12. In some embodiments, the region of the synthetic view is a vertical column of pixels, but the region of the synthetic view can also be a function of the height of a pixel, creating a shifted column of pixels.

As described earlier, a synthetic view 1410 can be calculated based on original camera views 1405 and an optical flow calculated between the original camera views. Similar techniques can be used generate the synthetic view mapping 1425. As described above, a synthetic view mapping 1425 for a synthetic view 1410 or a region of a synthetic view 1411 can be generated by the novel view generation module 240. In some implementations, the synthetic view mapping 1425 occurs without the calculations of any pixel intensity values for the synthetic view 1410. Similarly, the canvas view mapping 1430 can be generated using the position of the synthetic view and trigonometric methods to determine the correct region of the synthetic view 1411 associated with the region of the canvas view.

After the calculation of the canvas view mapping 1430 and the synthetic view mapping 1425 for the region of the canvas view 1416, the combined mapping 1440 for the region of the canvas view 1416 can be generated using a remapping process 1430. The remapping process 1435 can then be repeated for each other region in the canvas view 1415 to generate a combined mapping 1440 containing mapping information for each region of the canvas view 1415. In some embodiments, the synthetic view mapping 1425 and the canvas view mapping 1430 does not involve calculating any pixel intensity values for the canvas view 1415 or the synthetic view 1410, as each mapping is a vector field associating pixel locations but not transferring or calculating pixel intensity values for those locations.

After the remapping process, the combined mapping 1440 can then be applied to the original camera views 1405 to generate pixel intensity information for the canvas view 1415 based on the selected pixels 1406 in the original camera views 1405. In some embodiments, pixel intensity values of the canvas view 1415 are directly calculated from the pixel intensity values of selected pixels 1406 in the original camera views 1405 without an intermediate calculation of pixel intensity values of the synthetic view 1410.

Figure 15:
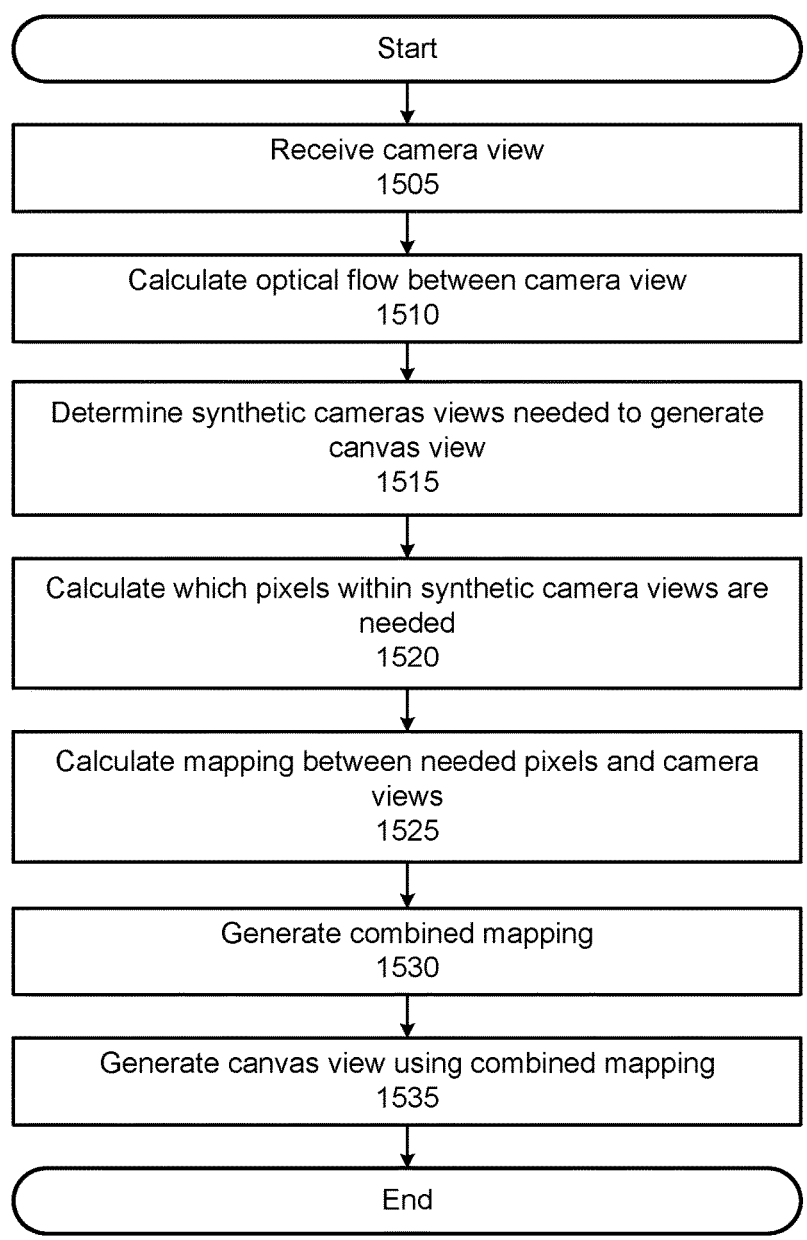
FIG. 15 is a flowchart illustrating a process for calculating a canvas view based on camera views, according to one embodiment.

FIG. 15 is a flowchart illustrating a process for calculating a canvas view based on camera views, according to one embodiment. Process 1500 begins when the light information approximation system 260 receives 1505 camera images from which to generate a canvas view. The optical flow calculation module 250 can then calculate 1515 the optical flow between adjacent camera views in the set of received camera views. For example, the optical flow calculation module 250 can calculate the optical flow based on an iterative process such as the process 900 described in relation to FIG. 9. Then, the light information approximation module 260 can determine 1515 which synthetic views are needed to generate the canvas view, and then further calculate 1520 which specific pixels or regions within the needed synthetic views capture the relevant light information. The mapping between the needed pixels and the received camera views can then be calculated 1525, for example by the novel view generation module 260. Based on the previously calculated mappings, the light information approximation module 260 can then generate 1530 a combined mapping between the received camera views and the canvas view. Finally, the canvas view 1535 can be generated by the light information approximation module 260.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating an optical flow, the method comprising:
   receiving a first camera view and a second camera view each comprised of a set of pixels, each camera view representing an image captured by a camera and wherein each camera view is associated with a location from which that camera view was captured;
   initializing an optical flow that maps pixels of the first camera view with corresponding pixels of the second camera view; and optimizing the optical flow for each pixel of the first camera view according to an ordered sequence of the pixels of the first camera view, wherein optimizing the optical flow for each pixel comprises:
  generating a set of optical flow proposals for the pixel, each optical flow proposal mapping the pixel to a pixel of the second camera view, the set of optical flow proposals comprising an optical flow proposal associated with one or more previous pixels in the ordered sequence;
  analyzing each optical flow proposal of the set of optical flow proposals; and
  updating the optical flow for the pixel based on a selected optical flow proposal of the set of optical flow proposals.

2. The method of claim 1, wherein an optical flow is a vector field associating each pixel of a camera view with an optical flow vector giving a displacement between the pixel and a corresponding pixel of another camera view.

3. The method of claim 2, wherein a set of optical flow proposals for a pixel comprises the optical flow vector associated with an upper neighbor of the pixel, the optical flow vector associated with the left neighbor of the pixel, and a random perturbation of the current optical flow vector.

4. The method of claim 1, further comprising establishing a variational optimization problem including data and regularization terms.

5. The method of claim 4, wherein updating the optical flow for a pixel comprises selecting the optical flow proposal that moves the variational optimization problem closest to a solution.

6. The method of claim 1, further comprising applying a median filter to the optical flow.

7. The method of claim 1, wherein receiving a first camera view and a second camera view includes receiving a set of camera views including the first and second camera views and further comprising initializing and optimizing an optical flow for each other camera view of the set of camera views.

8. The method of claim 1, wherein the optical flow for the pixels of the first camera view are optimized in an ordered sequence starting from the top left pixel and proceeding to the lower right pixel of the first camera view.

9. The method of claim 1, further comprising optimizing the optical flow for each pixel of the first camera view until a measurement of the optical flow quality reaches a threshold score.

10. The method of claim 1, wherein initializing the optical flow comprises:
  scaling up a lower resolution optical flow; and
  proportionally increasing the magnitude of optical flow vectors within the lower resolution optical flow.

11. A system comprising:
  an input module, the input module configured to receive a first camera view and a second camera view each comprised of a set of pixels, each camera view representing an image captured by a camera and wherein each camera view is associated with a location from which that camera view was captured;
  an optical flow calculation module, the optical flow calculation module configured to:
    initialize an optical flow that maps pixels of the first camera view with corresponding pixels of the second camera view; and
    optimize the optical flow for each pixel of the first camera view according to an ordered sequence of the pixels of the first camera view, wherein optimizing the optical flow for each pixel comprises:
      generating a set of optical flow proposals for the pixel, each optical flow proposal mapping the pixel to a pixel of the second camera view, the set of optical flow proposals comprising an optical flow proposal associated with one or more previous pixels in the ordered sequence;
      analyzing each optical flow proposal of the set of optical flow proposals; and
      updating the optical flow for the pixel based on a selected optical flow proposal of the set of optical flow proposals.

12. The system of claim 11, wherein an optical flow is a vector field associating each pixel of a camera view with an optical flow vector giving a displacement between the pixel and a corresponding pixel of another camera view.

13. The system of claim 12, wherein a set of optical flow proposals for a pixel comprises the optical flow vector associated with an upper neighbor of the pixel, the optical flow vector associated with the left neighbor of the pixel, and a random perturbation of the current optical flow vector.

14. The system of claim 11, wherein the optical flow calculation module is further configured to establish a variational optimization problem including data and regularization terms.

15. The system of claim 14, wherein updating the optical flow for a pixel comprises determining the optical flow proposal that moves the variational optimization problem closest to a solution.

16. The system of claim 11, further comprising applying a median filter to the optical flow.

17. The system of claim 11, wherein receiving a first camera view and a second camera view includes receiving a set of camera views including the first can second camera views and wherein the optical flow calculation module is further configured to initialize and optimize an optical flow for each other camera view of the set of camera views.

18. The system of claim 11, wherein the optical flow for the pixels of the first camera view are optimized in an ordered sequence starting from the top left pixel and proceeding to the lower right pixel of the first camera view.

19. The system of claim 11, wherein the optical flow calculation module is further configured to optimize the optical flow for each pixel of the first camera view until a measurement of the optical flow quality reaches a threshold score.

20. The system of claim 11, wherein initializing the optical flow comprises:
  scaling up a lower resolution optical flow; and
  proportionally increasing the magnitude of optical flow vectors within the lower resolution optical flow.

* * * * *

UNITED STATES PATENT AND TRADEMARK OFFICE
CERTIFICATE OF CORRECTION

PATENT NO. : 10,165,258 B2
APPLICATION NO. : 15/096167
DATED : December 25, 2018
INVENTOR(S) : Cabral et al.

It is certified that error appears in the above-identified patent and that said Letters Patent is hereby corrected as shown below:

In the Claims

In Column no: 26, Line(s) no: 42, Claim 17, "the first can second camera" to read as --the first and second camera--

Signed and Sealed this
Twenty-third Day of July, 2019

Andrei Iancu
*Director of the United States Patent and Trademark Office*